United States Patent [19]

Kamisaka et al.

[11] Patent Number: 5,708,960

[45] Date of Patent: Jan. 13, 1998

[54] SUBSCRIPTION NEWSPAPER DISPATCHING SYSTEM

[75] Inventors: Tadayuki Kamisaka, Yokohama; Satoshi Ikehama, Tokyo; Shigehiro Tomita, Sayama, all of Japan

[73] Assignee: Hitachi, Ltd., Tokyo, Japan

[21] Appl. No.: 389,402

[22] Filed: Feb. 16, 1995

[30] Foreign Application Priority Data

Feb. 17, 1994 [JP] Japan .................................. 6-020161

[51] Int. Cl.⁶ .............................. H04H 1/00; H04N 7/10; H04N 7/16; H01J 13/00
[52] U.S. Cl. .................................. 455/3.2; 348/5.5; 348/7; 348/10; 348/13; 348/460; 348/465; 348/467; 455/4.2; 455/6.2; 395/200.09
[58] Field of Search ............................. 455/3.1, 3.2, 4.1, 455/4.2, 5.1, 6.1, 6.2, 6.3, 26.1, 39; 348/10, 13, 17, 5.5, 6, 7, 12, 460, 461, 465, 467, 468, 473, 474, 476; 395/155–161, 200.09, 444; 380/10, 20; H04N 7/10, 7/14, 7/16

[56] References Cited

U.S. PATENT DOCUMENTS

| | | | |
|---|---|---|---|
| 5,191,410 | 3/1993 | McCalley et al. | 348/13 |
| 5,319,455 | 6/1994 | Hoarty et al. | 348/7 |
| 5,396,546 | 3/1995 | Remillard | 348/6 |
| 5,404,505 | 4/1995 | Levinson | 348/3 X |
| 5,630,067 | 5/1997 | Kindell et al. | 395/200.09 |

FOREIGN PATENT DOCUMENTS

| | | | |
|---|---|---|---|
| 63-131674 | 6/1988 | Japan | H04N 7/08 |
| 4-245818 | 9/1992 | Japan | H04H 1/00 |
| 5-89363 | 4/1993 | Japan | G07F 17/40 |
| 5-115067 | 5/1993 | Japan | H04N 7/20 |
| 5-122173 | 5/1993 | Japan | H04H 1/00 |
| 5-143618 | 6/1993 | Japan | H04H 1/00 |
| 5-260235 | 10/1993 | Japan | H04N 1/00 |

OTHER PUBLICATIONS

"Hitachi Review", vol. 74, No. 7 (1992), pp. 21–26.
"Printing Guidebook for Creators, 4", issued by Genko-sha.

*Primary Examiner*—John K. Peng
*Assistant Examiner*—John W. Miller
*Attorney, Agent, or Firm*—Fay, Sharpe, Beall, Fagan, Minnich & McKee

[57] ABSTRACT

In order to dispatch a newspaper to subscriber households through satellite communication, a newspaper edit/dispatch system in the head office of a newspaper publishing company electronically creates each paper sheet of national news section as first newspaper data, and transmits the first newspaper data to the branch offices of the company through a communication satellite. In a newspaper edit/broadcast system installed in each of the branch offices, the received first newspaper data and second newspaper data of a local news section are combined and edited into third newspaper data, the third newspaper data are encrypted, and the sort of newspaper and the date of issue thereof are affixed to the encrypted newspaper data. Such newspaper data are broadcast through the communication satellite. In each home terminal installed in the individual subscriber households, the newspaper data broadcasted by the edit/broadcast system from the branch office are received, decrypted by the use of a key obtained beforehand, and the newspaper data having the sort of newspaper and the date of issue thereof which agree with preset subscription contents are temporarily stored. Thereafter, the stored newspaper data are read and displayed in compliance with a subscriber's request.

30 Claims, 13 Drawing Sheets

SUBSCRIPTION NEWSPAPER DISPATCHING SYSTEM

BACKGROUND OF THE INVENTION

The present invention relates to an information dispatching system in which various kinds of information, such as information contained in newspapers, having heretofore been recorded on paper or similar media and circulated through distribution routes based on manpower, are dispatched to individual homes by radio broadcasting.

At present, newspapers, for example, are edited and printed as newspaper pages by a newspaper publishing company and are delivered to individual homes in the morning and evening by delivery persons.

Then, each newspaper subscriber reads the delivered newspaper pages at his home, or in a train or the like while commuting.

Regarding the example of the newspaper, however, the present-day system of printing news etc. on paper sheets and delivering the printed pages to individual homes manually is ineffective from the viewpoints of distribution cost, the cost of the paper, the immediate communicability of the information, the efficient utilization of pulp resources, etc.

Moreover, for each individual subscriber, the newspaper is not always sufficiently convenient for such reasons that the problem of disposing of the read newspaper exists, and that the size of each newspaper page is too large to enable the newspaper to be stored or read on the train, for example.

Applications relevant to the art include Japanese Patent Application Publication Nos. 5-115067, 5-260235, 63-131674, 5-143618, 5-89363, 5-122173, and 4-245818.

SUMMARY OF THE INVENTION

An object of the present invention is to provide an information dispatching system in which various kinds of information, including newspaper information, are dispatched directly to individual homes by radio broadcasting, thereby permitting subscribers to effectively utilize the dispatched information.

Another object of the present invention is to improve operating conditions in a newspaper information dispatching system that employs a radio circuit.

The present invention accomplishes the aforementioned objects with, for example, an information dispatching system comprising a central office, a plurality of local offices and a plurality of terminal offices, wherein:

the central office includes means for electronically creating first newspaper data, and means for transmitting the created first newspaper data to the local offices;

each of the local offices includes means for electronically creating second newspaper data, means for receiving the first newspaper data from the central office, means for creating third newspaper data into which the received first newspaper data and the created second newspaper data are combined and edited, and means for broadcasting the created third newspaper data through a radio channel; and each of the terminal offices includes means for receiving the third newspaper data broadcast from a specified one of the local offices, record means for recording the received third newspaper data, and means for reading and displaying the third newspaper data recorded by the record means.

Thus, by way of example, the central office transmits the newspaper data of a national news section as the first newspaper data, while each local office creates the newspaper data of a local news section as the second newspaper data and edits the created second newspaper data in combination with the above newspaper data of the national news section. The local office thereafter broadcasts the resulting third newspaper data through the radio channel, whereby the newspaper data based on the newspaper data of the national news section and closely relating to each local area can be created and dispatched.

Meanwhile, the above newspaper data broadcast from the local office are received by the terminal office which is installed, for example, at the home of each subscriber, and they are temporarily recorded by the record means. Thereafter, the recorded newspaper data are read, for example, in accordance with the subscriber's manipulation, and the image of a newspaper expressed by the read newspaper data is reconstructed and displayed.

Character information, picture information such as a still picture or a motion picture, and voice information are examples of the newspaper data which are handled in the information dispatching system. The three sorts of information items may be respectively transmitted separately and synthesized at each reception terminal, or they may be transmitted after having been synthesized on the transmission side. In any event, in the case of handling a plurality of information items, the respective information items need to be associated in a memory or the like. In the information dispatching system, accordingly, the newspaper page information items are reproduced in such a way that the respective information items are stored as element files, and that the element files are associated by a layout file and a directory file.

Further, in the newspaper dispatching system, the newspaper data are dispatched by employing a satellite circuit as may be needed. It is therefore desirable that the newspaper data are received only at homes which have subscribed to the newspaper. Accordingly, the terminal offices to utilize the newspaper are limited in such a way that the transmission data are encrypted, and that a cryptic key is specified by, for example, (1) an ID given to each home terminal and/or (2) the attribute of each document.

In operating the newspaper information dispatching system, the correction of the error component of the transmission data in the case of employing the satellite circuit is an example of a problem other than the handling of the cryptic key.

In the case of employing the satellite circuit, the transmission data contain the error component in relation to the distance between a satellite and each terrestrial station, etc. In the newspaper information dispatching system, therefore, an error detecting code is affixed to each of the transmission data, and the same data are repeatedly transmitted. More specifically, the terminal office on the reception side records the transmitted data, and decides whether or not each data item is error data, on the basis of the error detecting code. When the terminal office has subsequently received the retransmitted data, it records only the retransmitted data which were determined to be the error data in the past transmission, among the received data. This processing is iterated several times, whereby the data containing no error component can be dispatched to the terminal office. In addition, the newspaper information dispatching system may well be so constructed that, in a case where the error component is contained in spite of the repeated transmissions of the newspaper data from the transmission side, the terminal office requests the local office to retransmit or dispatch the newspaper data through the terrestrial circuit or the satellite circuit. Incidentally, the request for the retransmission may well be automatically made by the terminal equipment at the terminal office.

Further, in a case where the newspaper data are not dispatched to the terminal office side due to any fault of, e.g., the satellite circuit, the terminal office, which has prestored a scheduled time for the broadcast of the dispatch information, decides whether or not the newspaper information was received at the scheduled time, using its own timekeeping means. Upon deciding that there was a failure to receive the information, the terminal office requests the local office to retransmit the newspaper data by the method stated above.

The operating conditions of the newspaper information dispatching system are improved with respect to the above points.

DESCRIPTION OF THE PREFERRED EMBODIMENTS

Embodiments of an information dispatching system according to the present invention will be described below.

The application of the present invention to the dispatch of a newspaper will be described as the first embodiment.

Figure 1:
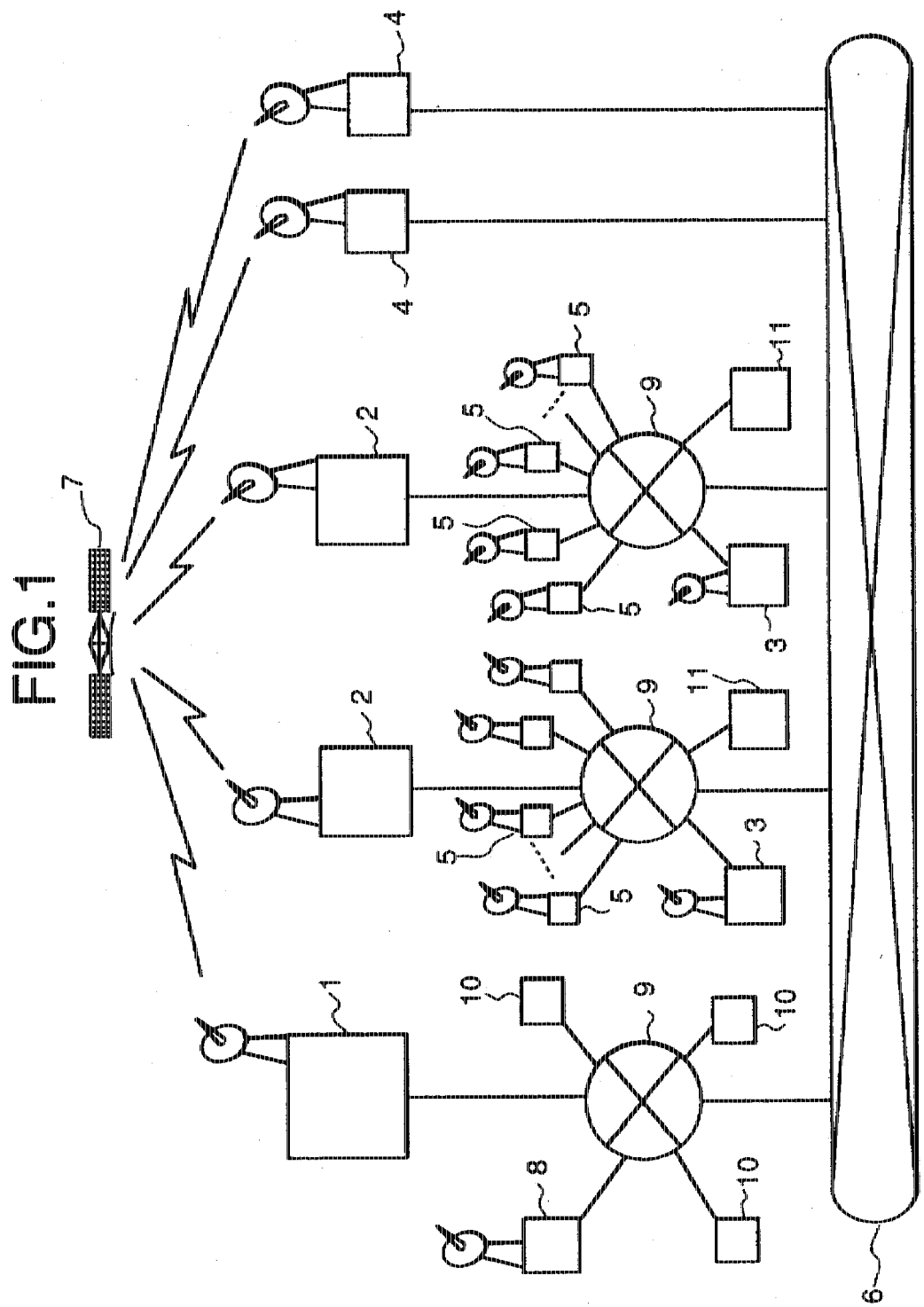
FIG. 1 is a general arrangement diagram showing the architecture of an information dispatching system according to an embodiment of the present invention.

FIG. 1 illustrates the architecture of the information dispatching system of this embodiment.

Referring to the figure, the information dispatching system comprises a newspaper edit/dispatch system 1 which is installed in the head office of a newspaper publishing company, newspaper edit/broadcast systems 2 which are installed in the branch offices of the company located in respective local areas, newsdealer terminals 3 and 4 which are respectively installed in newsdealers premises, and home terminals 5 which are installed in the homes of individual subscribers. Further, the embodiment includes a terrestrial network 6 such as a public network, a communication satellite 7 which provides radio channels, a common carrier 8, local terrestrial circuits 9, places of business 10 which offer information constituting the contents of the newspaper, and printing centers 11 which print newspaper pages so as to distribute the printed pages therefrom in the respectively corresponding local areas. Incidentally, the places of business 10 as mentioned above include, for example, the Meteorological Agency which offers weather information, a stock exchange which offers stock price information, the Bank of Japan which offers foreign exchange information, and various corporations which offer advertisements.

In such an architecture, the newspaper edit/dispatch system 1 in the head office of the newspaper publishing company electronically creates the newspaper pages of a national news section as newspaper data by editing, for example, news items created on the basis of information offered through the local terrestrial circuits 9 by the places of business 10, news items received from the newspaper edit/broadcast systems 2 in the branch offices of the newspaper publishing company by utilizing the radio circuits provided by the communication satellite 7, and news items created by newspeople. Thereafter, the newspaper edit/dispatch system 1 transmits the created newspaper data to the newspaper edit/broadcast systems 2 of the branch offices by utilizing the radio circuits provided by the communication satellite 7. By the way, such transmission and reception of the newspaper data between the head and branch offices can utilize, for example, a technique described in "HITACHI REVIEW", VOL. 74, NO. 7 (1992–7), PP. 21 to 26.

In the newspaper edit/broadcast system 2 of each branch office of the newspaper publishing company, the newspaper data of the newspaper to be dispatched in the corresponding local area are created from the received newspaper data of the national news section, and newspaper data expressing the newspaper pages of a local news section in which information on the local area assigned to the pertinent branch office itself have been edited. The created newspaper data are sent to the nearest printing center 11 through the terrestrial circuit 9, while at the same time, they are broadcasted by utilizing the radio circuit provided by the communication satellite 7. In the printing center 11, printing film is prepared from the newspaper data, lithographic plates are fabricated from the printing film, and the newspaper pages of the newspaper data of the national and local news sections are printed by offset lithography employing lithographic plates. Thereafter, the printed newspaper pages are distributed to the newsdealers equipped with the terminals 3 or 4. Each of the newsdealers having the terminals 3 inserts bills in the distributed newspaper sheets as requested, and then delivers the newspaper sheets to homes which are not equipped with the home terminals 5.

Additionally, in each newsdealer having the terminal 4, the newspaper sheets distributed from the printing center 11 are sold after inserting bills which the pertinent newsdealer has been requested to insert in the newspaper sheets. Also, the newspaper data broadcast from the system 2 of the branch office by the radio circuit are received by the newsdealer terminal 4, the bill data of the aforementioned bills are affixed to the received newspaper data, and the resulting newspaper data are stored in portable storage media such as magnetooptic disks. The storage media are sold at the newsstands of kiosks etc. near the pertinent newsdealer having the terminal 4. Meanwhile, in each of the home terminals 5, the newspaper data broadcasted from the branch office having the system 2 are received and are temporarily stored. Thereafter, the newspaper pages are reconstructed and displayed in compliance with the subscriber's request. Herein, the pertinent newsdealer having the terminal 3 can radio broadcast the data of the aforementioned bills to each home terminal 5.

The transmission and reception among the newspaper edit/dispatch system 1 of the head office, the newspaper edit/broadcast systems 2 of the branch offices and the newsdealer terminals 3 and 4 of the newsdealers need not always be performed through the radio circuits provided by the communication satellite 7 as described above, but they may well be partly or wholly done by utilizing the terrestrial circuits 9 and the terrestrial network 6. The newspaper data radio broadcast directly from the head office (system 1) and the branch offices (systems 2) in the foregoing aspect of operation may well be sent temporarily to the common carrier 8 through the terrestrial circuits 9 and the terrestrial network 6 so as to transmit them from this common carrier.

There will now be described the newspaper edit/dispatch system (1 in FIG. 1) which creates and transmits the newspaper data in the head office of the newspaper publishing company.

Figure 2:
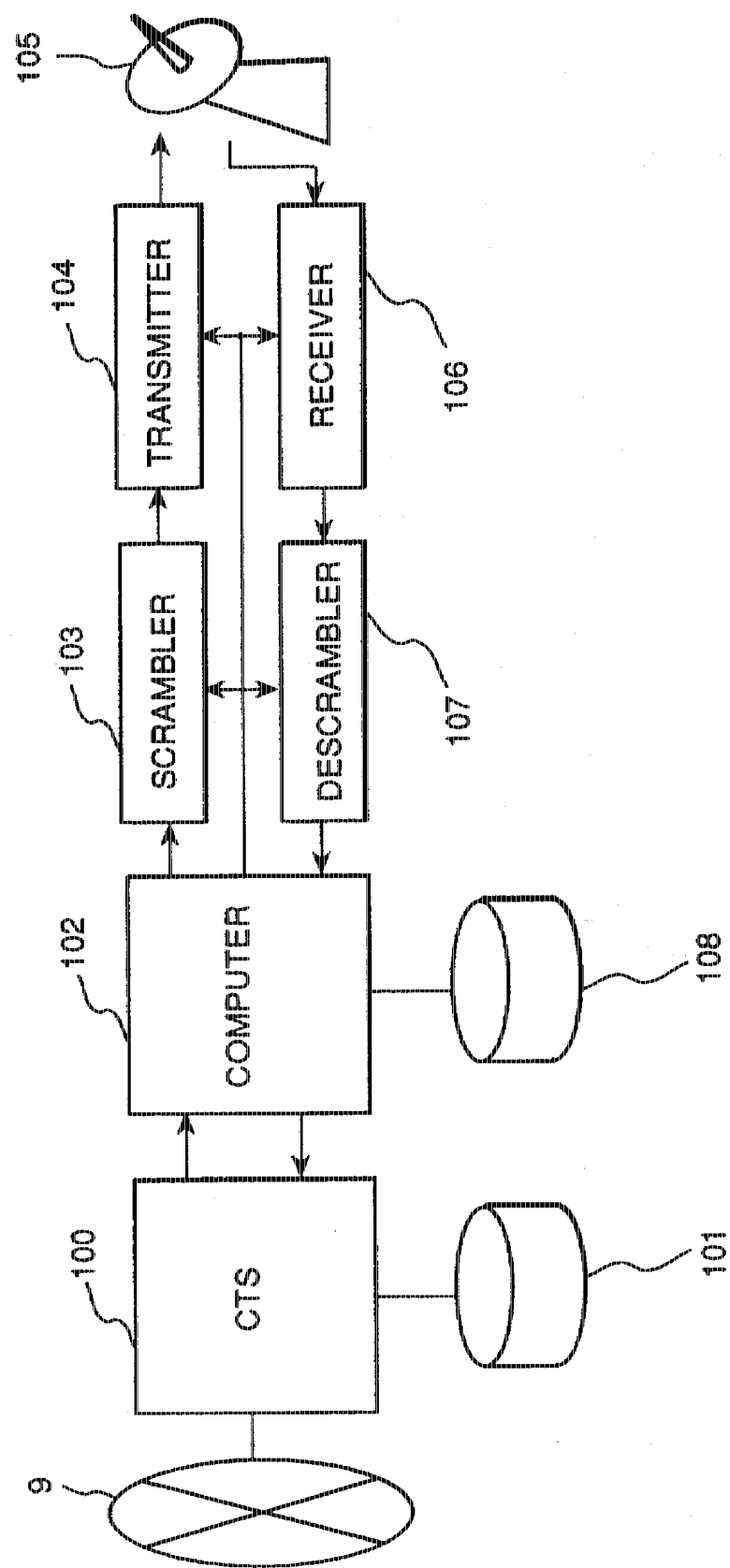
FIG. 2 is a block diagram showing the architecture of an information edit/transmission system in the embodiment of FIG. 1.

FIG. 2 illustrates the architecture of the newspaper edit/dispatch system 1.

Referring to the figure, this system 1 includes a CTS (Computerized Typesetting System) 100, a computer 102, databases 101 and 108, a scrambler 103, a transmitter 104, an antenna 105 for communications utilizing the satellite (7 in FIG. 1), a receiver 106 and a descrambler 107.

The CTS 100 accepts, as its inputs, news items and photographs given in the form of digital data and advertisement data stored in the database 101. It edits the inputs in accordance with instructions from an operator, and creates newspaper data which specify newspaper pages and which are output. Since such CTS's have already been used extensively in newspaper publishing companies, book publishing companies, etc., they shall be omitted from detailed description. Incidentally, the CTS's are explained in detail in "PRINTING GUIDEBOOK FOR CREATORS, 4" (issued by Genko-sha), etc.

Figure 3:
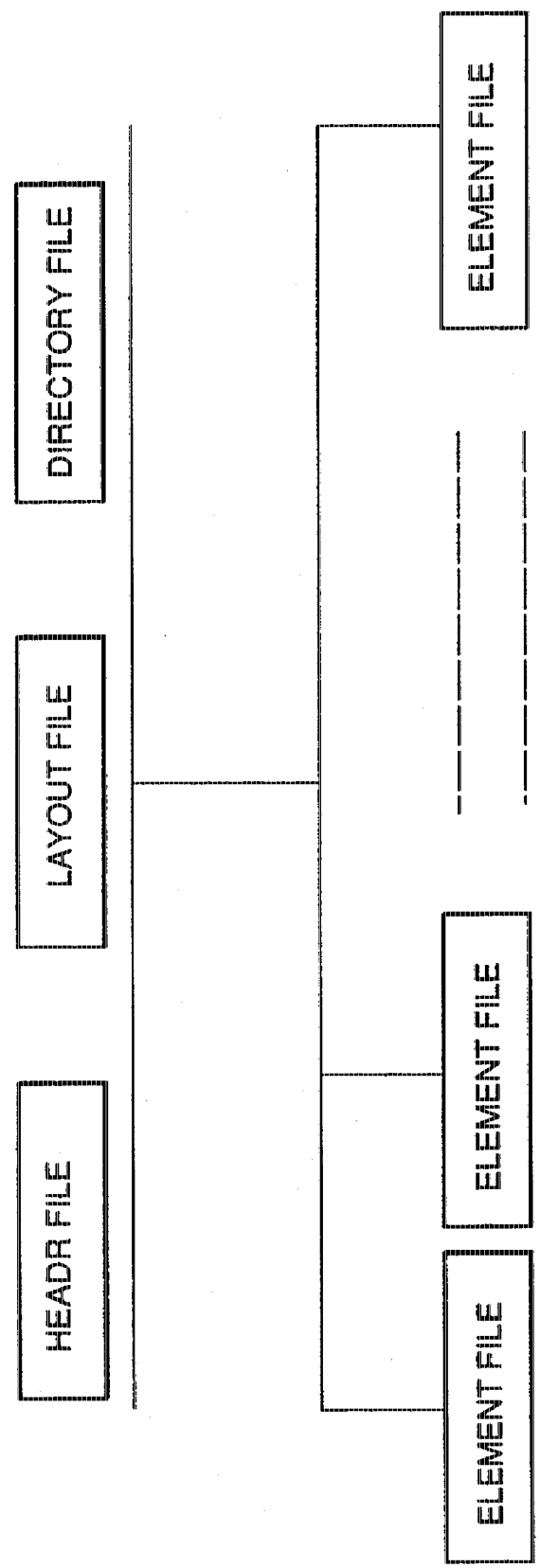
FIG. 3 is a diagram showing the structure of newspaper data in the embodiment of FIG. 1.

Here, the structure of the newspaper data is as illustrated in FIG. 3.

The newspaper data are constructed of a header file, a layout file, element files and a directory file as shown in the figure.

The element files include a text file in which the texts of the news items constituting the newspaper are stored, a still picture file in which the still picture data of the photographs and advertisements are stored, etc. Here in this embodiment, a motion picture file storing motion picture data therein is also employed as an element file. Still pictures and motion pictures are stored in the element files in terms of the data coded in accordance with predetermined coding rules such as so-called JPEG (Joint Photographic coding Experts Group) or MPEG (Moving Picture Experts Group). Owing to the adoption of such a motion picture file, a new aspect is introduced into conventional newspapers which consist only of character information and still picture information.

The header file is a file describing the corresponding relationships between the headings of the news items contained in the newspaper and the pages where the news items exist.

The layout file is a file describing the layout of the texts, photographs etc. expressed by the respective element files, in other words, the areas of the pages of the newspaper where the texts, photographs etc. are laid out. In addition, in this embodiment, the areas of the pages of the newspaper where the motion picture files are held in correspondence are also described in the layout file.

The directory file is a file describing, for example, the filenames and sorts (the header file, the element file, etc.) of the files contained in the newspaper data, and the data formats (the text, the still picture coding system, etc.), the dates of creation and the number of versions of the respective files.

Referring back to FIG. 2, upon receiving such newspaper data from the CTS 100, the computer 102 affixes an error correcting code and necessary control information to the newspaper data, and it commands the transmitter 104 to transmit the resulting newspaper data to the individual branch offices, in accordance with branch office information etc. stored in the database 108. Also, it delivers the newspaper data to the scrambler 103.

The scrambler 103 encrypts the newspaper data to be transmitted by the use of a predetermined key.

The transmitter 104 transmits the encrypted newspaper data to the newspaper edit/broadcast systems (2 in FIG. 1) of the respective branch offices through the antenna 105 and the satellite (7 in FIG. 1) in accordance with a predetermined transmission format.

On the other hand, the descrambler 107 decrypts, using a predetermined key, those encrypted data of the news items, photographs etc. which the receiver 106 has received from any of the newspaper edit/broadcast systems 2 of the branch offices through the antenna 105 and the satellite (7) in accordance with a predetermined format. The decrypted data are input to the CTS 100 through the computer 102, and are used for editing the newspaper until they are processed into the element file.

Next, there will be described the newspaper edit/broadcast system 2, which edits and broadcasts the newspaper in each of the branch offices of the newspaper publishing company.

The architecture of the newspaper edit/broadcast system 2 is the same as that of the newspaper edit/dispatch system 1 shown in FIG. 2.

The transmission of a news item or a photograph from the newspaper edit/broadcast system 2 to the newspaper edit/dispatch system 1 of the head office is the same as that of the newspaper data from the newspaper edit/dispatch system 1 of the head office to the newspaper edit/broadcast system 2, except that the subject of the transmission from the system 2 is a news item or photograph accepted into the CTS 100.

Meanwhile, the terminal IDs (identifiers) of the newsdealer terminal 3 of the newsdealer under contract with the pertinent branch office and the home terminals 5 possessed by the subscribers of the newspaper, and the contents of contracts associated with the terminal IDs are registered in the database 108 of the newspaper edit/broadcast system 2 that is installed in each branch office. The terminal IDs are IDs which are appropriate to the newsdealer terminal 3 and the home terminals 5. In addition, the contents of the contracts are conditions (for example, the kinds of newspapers and the terms of subscriptions) with which the subscribers are in agreement with the pertinent branch office. The kinds of newspapers are, for example, a sporting newspaper, a general newspaper and a financial newspaper.

Herein, the computer 102 of the newspaper edit/broadcast system 2 supplies each of the subscribers with information items to be explained below, in repeated cycles.

Figure 4A:
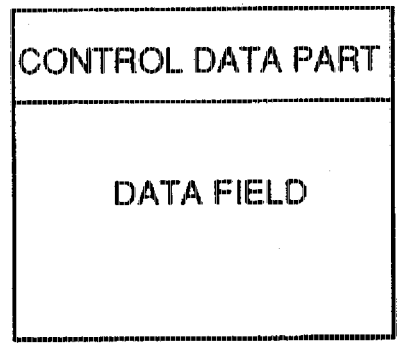
FIGS. 4A through 4C are diagrams each showing a frame which is used for broadcast in the embodiment of FIG. 1.

The computer 102 transfers a control frame which is composed of a control data part and a data field as shown in FIG. 4A, to the transmitter 104 without the intervention of the scrambler 103. In this case, the control data part stores therein the individual terminal ID of the pertinent subscriber and a command for registering the contents of the contract, while the data field stores therein an information provider ID expressive of the office offering the newspaper (the  branch office of the  newspaper publishing company) and the contents of the contract stored in the database 108 in correspondence with the pertinent terminal ID.

Subsequently, the transmitter 104 disassembles the control frame described above, and stores the respective data of the control data part and the data field in the data field of a transmission frame shown in FIG. 4C. Further, it affixes an error correcting code (ECC) to the data field in the transmission frame, and broadcasts the transmission frame on a TDM (time division multiplex) channel for the control frame, through the antenna 105 and the satellite 7. That is, in this embodiment, TDM channels on a single frequency channel are employed.

On the other hand, the newspaper data are broadcast as explained below.

The descrambler 107 of the newspaper edit/broadcast system 2 decrypts, using the same key as that of the newspaper edit/dispatch system 1 of the head office, the encrypted newspaper data which the receiver 106 has received from the head office system 1 through the antenna 105 and the satellite 7 in accordance with the predetermined format. The decrypted newspaper data are input to the CTS 100 through the computer 102 so as to be edited in combination with the newspaper pages of the local news section. That is, the element files are added, and the header file and layout file are altered. The combined and edited newspaper data are output to the computer 102.

The combined and edited newspaper data may well be also sent from the CTS 100 to the printing center 11 through the local terrestrial circuit 9.

Figure 4B:
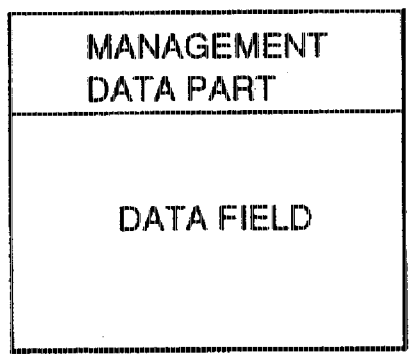
Figure 4C:
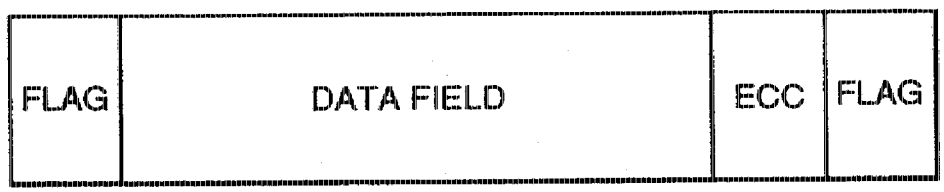

Subsequently, the computer 102 commands the transmitter 104 to broadcast a data frame in a format composed of a management data part and a data field as shown in FIG. 4B. In this case, the kind of newspaper, the date of issue, and the ID expressive of the information provider (the  branch office of the  newspaper publishing company) are stored in the management data part, while the newspaper data are stored in the data field.

That is, the computer 102 transfers the data stored in the management data part directly to the transmitter 104 without the intervention of the scrambler 103, whereas it transfers the data stored in the data field to the transmitter 104 through the scrambler 103. On this occasion, the scrambler 103 encrypts the newspaper data stored in the data field, by the use of a predetermined key.

Subsequently, the transmitter 104 disassembles the data frame stated above, and stores the respective data of the management data part and the data field in the data field of the transmission frame shown in FIG. 4C. Further, it affixes an error correcting code (ECC) to the data field in the transmission frame, and broadcasts the transmission frame on a TDM channel for the data frame that is included in the same frequency channel as that of the foregoing TDM channel for the control frame, through the antenna 105 and the satellite 7. Thus, in this embodiment, the transmission frame of the control frame and that of the data frame are broadcasted on different TDM channels on the identical frequency channel. In this regard, however, both the transmission frames may well be broadcast on the identical frequency channel without employing the TDM channels, and frames in an identical format may well be employed.

Next, the home terminal 5 installed at each subscriber home will be described.

Figure 5:
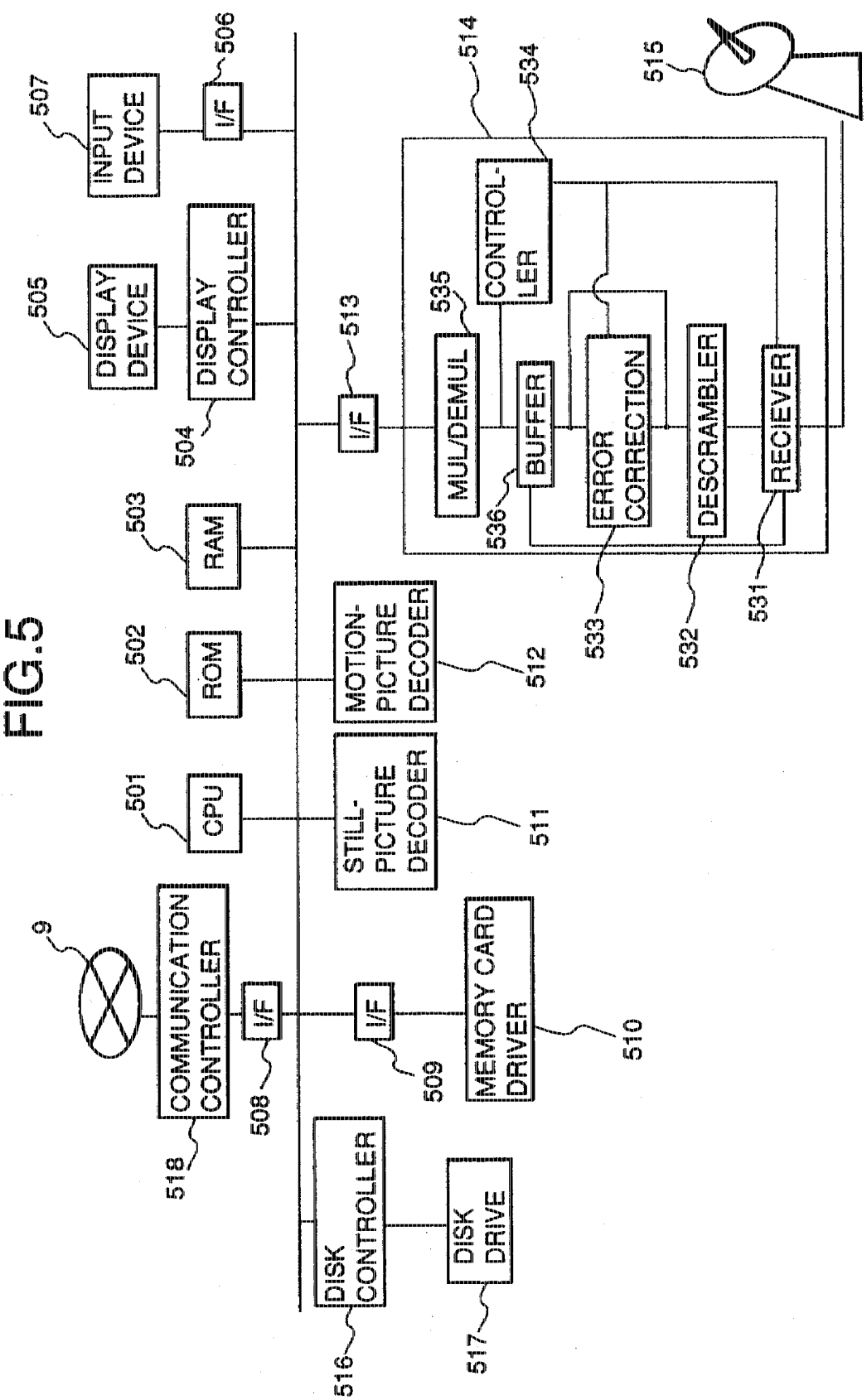
FIG. 5 is a block diagram showing the architecture of a home terminal in the embodiment of FIG. 1.

FIG. 5 illustrates the architecture of the home terminal 5.

Referring to the figure, the home terminal 5 includes a CPU 501, a ROM 502, a RAM 503, a display controller 504, a display device 505, an input device 507 such as a keyboard or mouse, a memory card driver 510, a still-picture decoder 511, a motion-picture decoder 512, a tuner 514, an antenna 515, a disk controller 516, a disk drive 517, and a communication controller 518 such as modem or TA (terminal adapter). Also included are I/F (interface) circuits 506, 508, 509 and 513.

Additionally, the tuner 514 includes a receiver 531, a descrambler 532, an error correcting circuit 533, a controller 534, a multiplexer/demultiplexer 535 and a reception buffer 536.

Now, the operation of the home terminal 5 will be explained.

In order to utilize the broadcast of the newspaper data from the branch office of the newspaper publishing company at the home terminal 5, a descrambler key needs to be acquired and set in the descrambler 532.

The subscriber-to-be acquires the descrambler key, for example, in such a way that he/she receives a memory card storing the descrambler key therein, from a salesperson after his/her contract with the newsdealer (having the terminal 3), and installs the descrambler key into the home terminal 5 by means of the memory card driver 510. Alternatively, he/she purchases a disk type storage medium in which the descrambler key is recorded and which is sold by the newsdealer, and installs the descrambler key through the disk drive 517.

An alternative method utilizing no ID card is one in which the subscriber-to-be accesses a predetermined contract center through the modem 518 and acquires the descrambler key by reception.

When the descrambler key has been acquired in this way, the CPU 501 sets the descrambler key in the descrambler 532 of the tuner 514 through the controller 534 thereof, in association with the frequency channel and TDM channel on which the data frame storing the newspaper data of the subscriptive newspaper therein is to be broadcast.

On the other hand, when the channel of the receiver 531 has been set by the subscriber to the frequency channel on which the newspaper under contract is to be broadcast, the receiver 531 receives the transmission frame transmitted on the TDM channel for the control frame (this transmission frame corresponds to FIG. 4A) and delivers the received frame to the error correcting circuit 533. Then, the error correcting circuit 533 corrects any transmission error by the use of the error correcting code contained in the transmission frame. The corrected data of the transmission frame are directly written into the reception buffer 536, and the frame shown in FIG. 4A is restored.

Further, the receiver 531 receives the transmission frame transmitted on the TDM channel for the data frame (this transmission frame corresponds to FIG. 4B) and delivers the received frame to the error correcting circuit 533. Then, the error correcting circuit 533 corrects any transmission error by the use of the error correcting code contained in the transmission frame. In the corrected data of the transmission frame, the management information is directly written into the reception buffer 536, and the newspaper data are written into the reception buffer 536 through the descrambler 532. Such partitioning of the data items can be realized by, for example, affixing special identification flags before and behind the newspaper data and recognizing the flags in the receiver 531. Alternatively, the data field and the management information part shown in FIG. 4B may well be correlated with each other and broadcast using separate TDM channels.

The descrambler 532 descrambles the newspaper data by the use of the descrambler key set before in correspondence with the TDM channel of the frequency channel on which the data frame has been received.

The frames restored in the reception buffer 536 (the frames shown in FIGS. 4A and 4B) are successively sent to the RAM 503 through the multiplexer/demultiplexer 535 as well as the I/F circuit 513 so as to be stored therein.

Subsequently, the CPU 501 reads out the control data part of the control frame (refer to FIG. 4A) sent to the RAM 503, and runs the command on condition that the terminal ID of the pertinent home terminal 5 is contained in the control data part. As explained before, the command causes the RAM 503 to register therein the contents of the contract stored in the control data part.

Thus, the CPU 501 registers the information provider ID and the contractual contents contained in the data field shown in FIG. 4A in the RAM 503 as utilization permission information. However, in a case where the utilization permission information items having the information provider ID contained in the data field of the frame have already been registered, the registered contents are rewritten into the contractual contents received anew.

Likewise, when the data frame (refer to FIG. 4B) has been transferred to the RAM 503, the CPU 501 collates the management information of the management data part of this data frame with the utilization permission information (information provider ID and contractual contents) registered before. More specifically, the CPU 501 checks whether or not the date of issue, the kind of the newspaper and the information provider ID which are contained in the management information agree with the information provider ID and the contractual contents (the kind of the newspaper and the subscription term of the contract) which are registered in the RAM 503. Herein, in the presence of the agreeing information items, the newspaper data contained in the data field of the data frame (FIG. 4B) are recorded in the disk drive 517, and in the absence thereof, the transferred data frame is discarded.

Thereafter, when the subscriber gives the instruction of reproducing the received newspaper data, the CPU 501 searches the newspaper data recorded in the disk drive 517 for the directory file, and displays the list of directories in the directory file on the display device 505. In the directory file, an attribute identifier capable of distinguishing the directory file from any other kind of file is affixed to the filename of this directory file. Herein, a name, such as " Newspaper, Dated , Morning Edition" by which the newspaper corresponding to the directory file can be recognized is given as the filename.

Further, the subscriber manipulates the input device 507 to designate the directory which corresponds to the newspaper to-be-reproduced. Then, the CPU 501 operates to fetch the header file stated in the directory designated by the subscriber and to display the list of headings in the header file.

Figure 6:
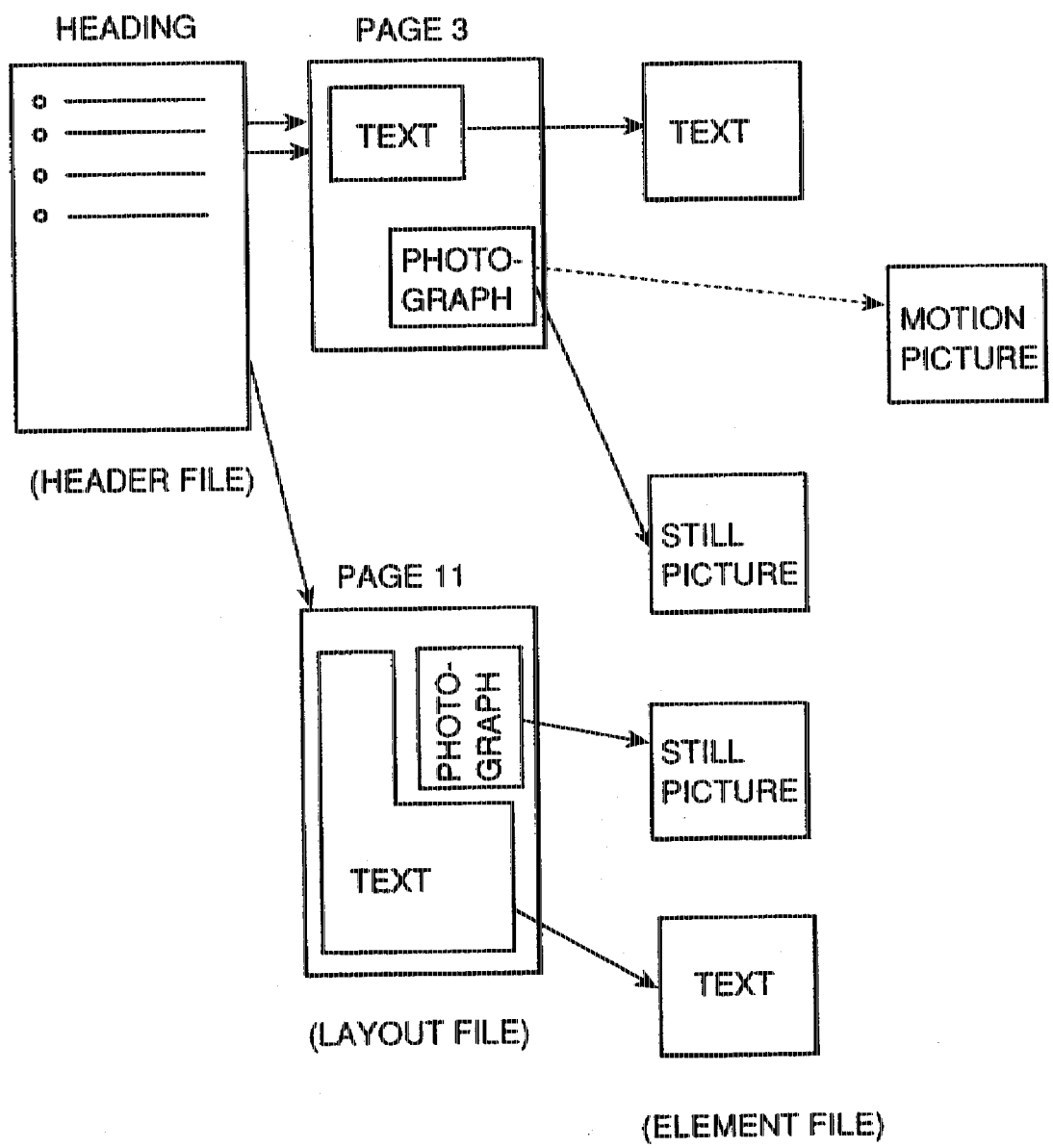
FIG. 6 is a diagram for explaining the operation of reading newspaper data in the embodiment of FIG. 1.

Subsequently, when the heading is designated through the input device 507 by the subscriber, the CPU 501 obtains a page in which a content corresponding to the designated heading is stated, as illustrated in FIG. 6. More specifically, the CPU 501 searches for the layout file corresponding to the pertinent heading and obtains the statements of a corresponding layout. Subsequently, the CPU 501 fetches the element files of, e.g., a news item and a photograph laid out on the pertinent page in accordance with the statements of the layout, and operates to present a display on the display device 505 in accordance with the stated layout. On this occasion, a still-picture file is decoded by the still-picture decoder 511, and the decoded still picture is displayed.

In addition, in a case where an area associated with a motion-picture file by the layout file has been designated on the above display by the subscriber, the corresponding motion-picture file is decoded by the motion-picture decoder 512, and the decoded motion picture is displayed in the area or on the whole screen of the display device 505. The original display is resumed when the display of the motion picture has ended or when a predetermined manipulation has been performed. Such an area associated with a motion-picture file should desirably be displayed so that the association can be recognized. Similarly to the area of the motion-picture file, areas can be associated with a text file, a still-picture file, a voice file etc. so as to be reconstructed and displayed in accordance with the designations of the respective areas. In the case of handling the voice file, however, also a voice decoder must be mounted.

The display of another document is also permitted by associating each area with the document file or header file of the other document and displaying the heading of the other document in accordance with the designation of the area. In this way, a hierarchic newspaper can be realized.

Each area can also be associated with a predetermined program or data. By way of example, the telephone No. of an advertiser, the order code of an article, etc. may well be allocated to an area within an advertisement page. Herein, in accordance with the designation of the area, the order code is automatically transmitted to the advertiser by dialing the telephone No. through the communication controller 518 and the terrestrial circuit 9 as well as the terrestrial network 6.

Additionally, the CPU 501 executes various display operations such as next-page display, previous-page display and designated-page display, in accordance with the subscriber's manipulations.

Next, the newsdealer terminal 3 or 4 will be described.

Figure 7:
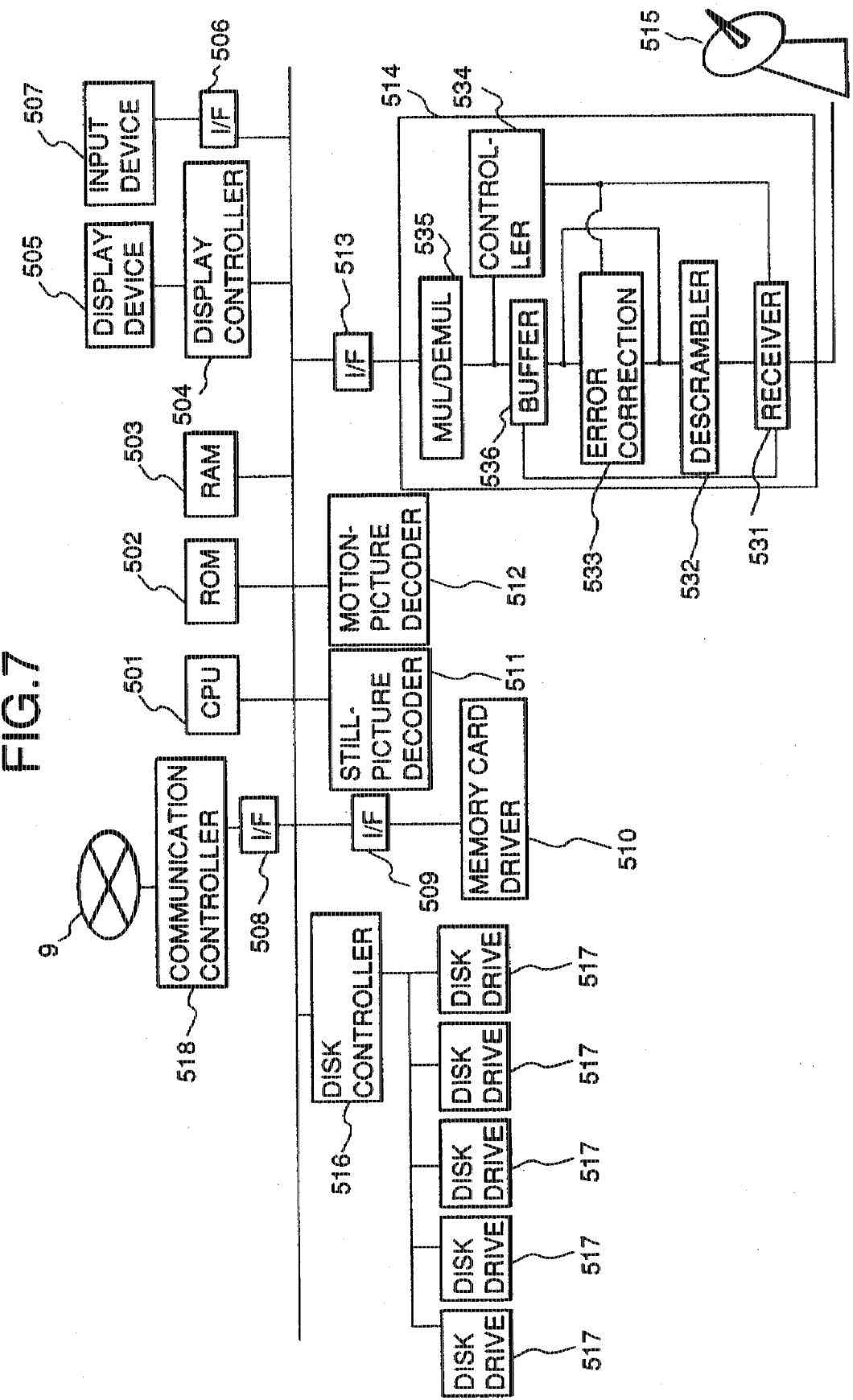
FIG. 7 is a block diagram showing the architecture of a newsdealer terminal in the embodiment of FIG. 1.

FIG. 7 illustrates the architecture of the newsdealer terminal 3 or 4.

The architecture of the newsdealer terminal 3 or 4 is similar to that of the home terminal 5, but the former differs from the latter in the point of including a plurality of disk drives (517) by which the newspaper data are recorded in parallel. Each of the newsdealer terminals 3 and 4 records the newspaper data in portable type disk storage media to be explained below, by the use of the disk drives (517), and sells the disk storage media thus prepared. Incidentally, the newsdealer terminal 3 is also furnished with means, not shown in FIG. 7, for transmitting the bill data of inserts, which the newsdealer having the pertinent terminal 3 handles, to the home terminals 5.

The disk drive 517 included in each of the home terminal 5 and the newsdealer terminals 3 and 4 is a write/read device which writes and reads data into and out of the portable type disk storage medium, which may be a magnetooptic disk. Each of the subscribers takes the disk storage medium containing the recorded newspaper data out of the home terminal 5, or purchases it from the newsdealer having the terminal 3 or 4. He/she can utilize the disk storage medium by the use of a portable read device to be explained below.

Figure 8:
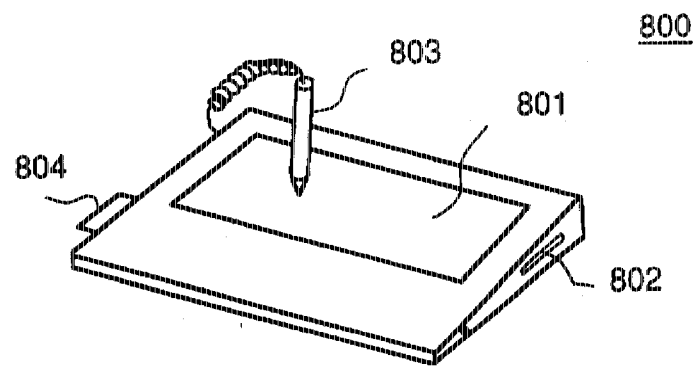
FIG. 8 is a perspective view showing the external appearance of a portable read terminal in the embodiment of FIG. 1.

FIG. 8 illustrates the external appearance of the portable read device.

As shown in the figure, the portable read device 800 is a battery-driven terminal which includes a liquid-crystal (LC) panel 801 as a display unit, a disk drive 802 as a read unit, and an input pen 803 as a pointing device. Numeral 804 denotes a battery.

Figure 9:
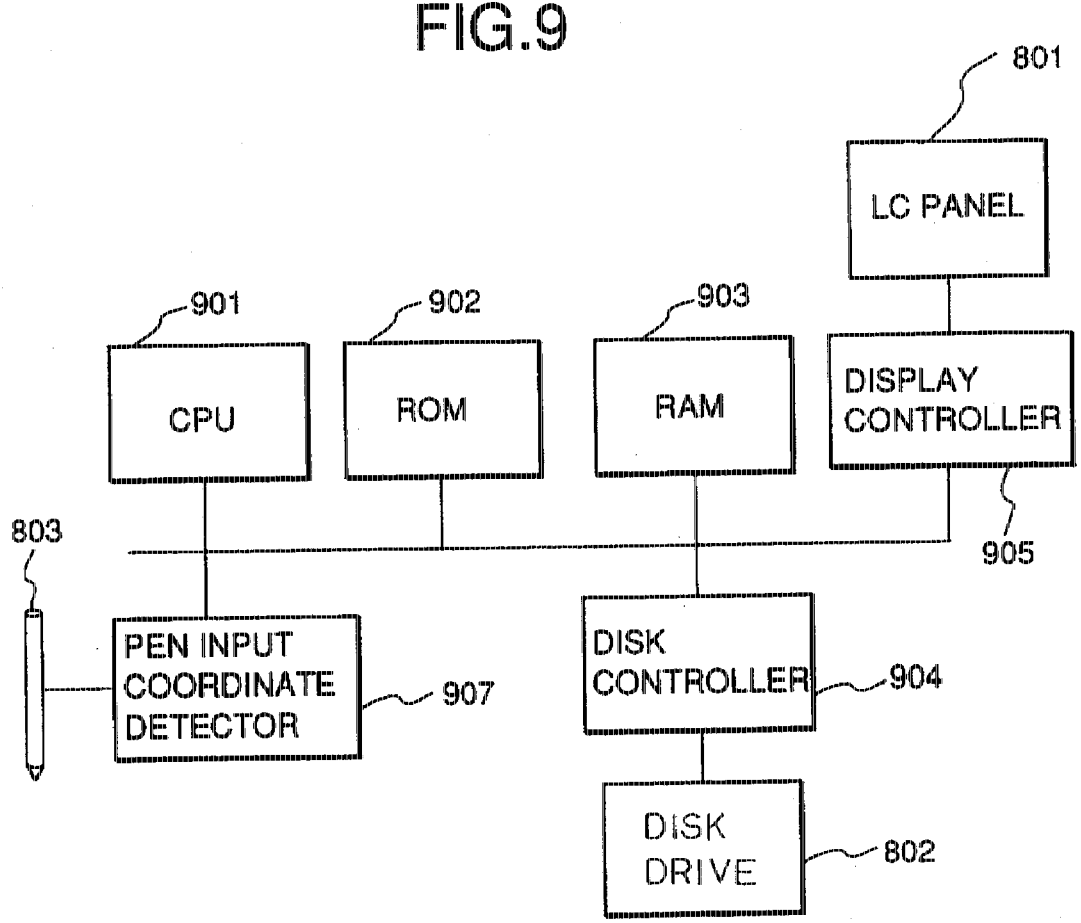
FIG. 9 is a block diagram showing the internal construction of the portable read terminal depicted in FIG. 8.

Further, FIG. 9 illustrates the internal construction of the portable read device 800.

Referring to the figure, the device 800 is constructed of a CPU 901, a ROM 902, a RAM 903, a disk controller 904, the disk drive 802, a display controller 905, the LC panel 801, the input pen 803, and a pen input coordinate detector 907.

Since the operation of such a portable read terminal 800 for reading the newspaper data is the same as the read operation of the home terminal 5 stated before, it shall not be repeatedly explained.

Although, in this embodiment, a disk storage medium is employed as the portable storage medium for storing the newspaper data, it may well be another portable storage medium (for example, a memory card).

Figure 10B:
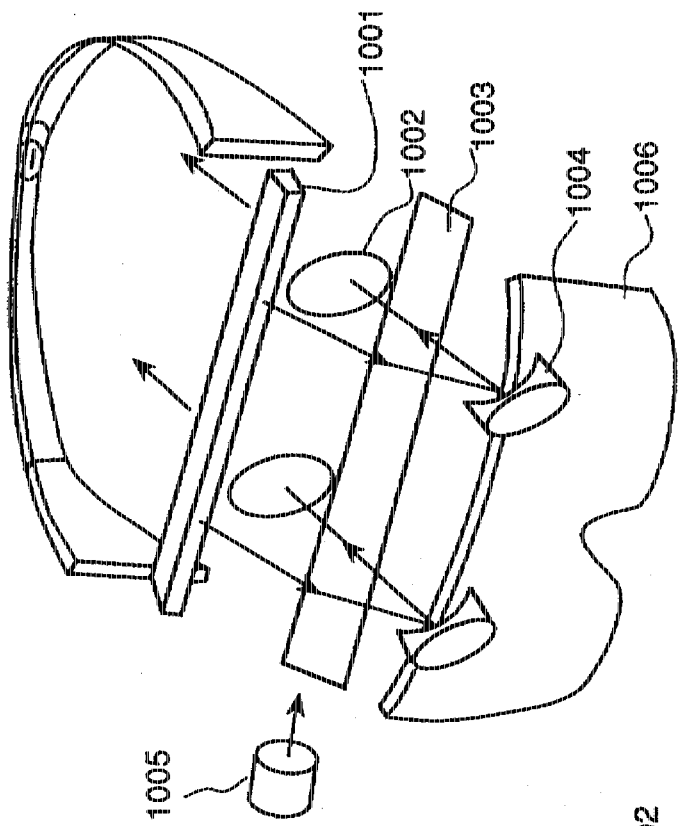
FIGS. 10A and 10B are perspective views respectively showing the external appearance and internal structure of a spectacles-type display device in the embodiment of FIG. 1.
Figure 10A:
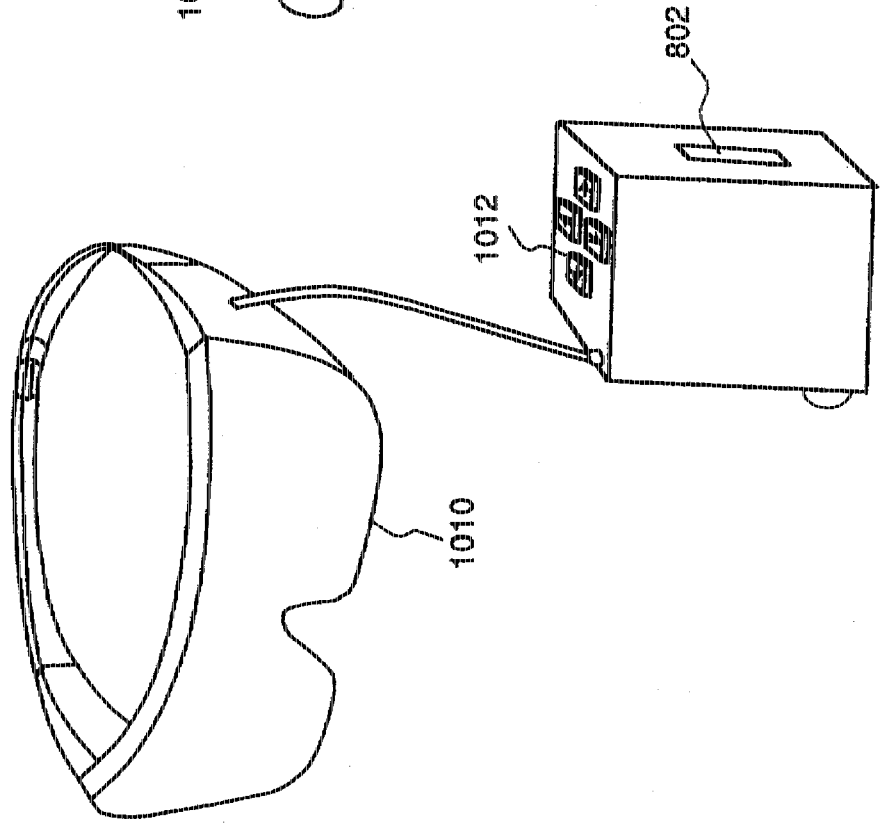

In addition, as the display unit of the portable read terminal 800, the LC panel 801 may well be replaced with a spectacles-type display device as shown in FIGS. 10A and 10B.

FIG. 10A illustrates the external appearance of the display device 1010 of the portable read terminal, while FIG. 10B illustrates the internal structure thereof.

As seen from FIG. 10B, the display device includes an LED array 1001, lenses 1002, a plane mirror 1003, concave mirrors 1004, a vibrating motor 1005 and an opaque cover 1006.

Light emitted from the LED array 1001 is bent or turned by the plane mirror 1003 and the concave mirrors 1004 in the order mentioned. The bent light is passed through the lenses 1002, and is visually recognized by the subscriber wearing the spectacles-type display device. Here, an image to be visually recognized by the subscriber is a virtual one formed by the concave mirrors 1004, and is recognized several tens [cm] ahead by the subscriber. In addition, a picture which the LED array 1001 displays at one time is one line of, for example, a newspaper picture. However, the subscriber is caused to visually recognize the newspaper picture of predetermined area as if this picture were displayed at one time, owing to the following contrivance: The LED array 1001 displays the respective lines of the newspaper picture iteratively at high speed, and the vibrating motor 1005 vibrates the plane mirror 1003 in synchronism with the display operations so that the line displayed by the LED array 1001 may exist at the position of the image corresponding to the particular line. The display area is controlled in accordance with the manipulative input situation of cursor keys 1012 shown in FIG. 10A. In this figure, numeral 802 indicates a disk drive.

As described above, according to this embodiment, the newspaper can be dispatched by the broadcast so as to be available to only the subscribers. Moreover, each of the subscribers can utilize the dispatched newspaper data in, for example, a streetcar similarly to the conventional newspaper by the use of the portable read terminal explained before.

Meanwhile, the information dispatching system thus far described may well be modified and extended as explained below.

In the foregoing embodiment, the newspaper data are broadcast every branch office of the newspaper publishing company. Alternatively, however, the parts of the local news sections may be collected from the respective branch offices to the newspaper edit/dispatch system 1 of the head office and be broadcast over the whole country by the head office system 1. In this case, the element files of the part of the national news section, and the local news sections corresponding to the element files of the local news section parts of the respective local areas, are combined and edited. Layout files, document files and header files after the combination and editing are broadcast in the state in which management information items containing the identifications of the national news section and the local areas of the local news sections are affixed to the respectively corresponding files. In each of the newsdealer terminals 3 and 4 and the home terminals 5, the identifications of the local news sections to be received are previously included in the contractual contents of the pertinent terminal stated before. Thus, each of the newsdealer terminals 3 and 4 and the home terminals 5 is adapted to receive and record only the newspaper data as to which the identification of the national news section and the identifications of the contractual local news sections are included in the management information.

Incidentally, the newspaper data to be broadcast may well be made the set of combined page data by simply accepting the data of the element files every page.

In the foregoing embodiment, the contents of the contract, in other words, the information items to be registered as the reception or utilization permission information in each of the newsdealer terminals 3 and 4 and the home terminals 5, are set in the pertinent terminal by transmitting the control frame storing them (refer to FIG. 4A). This method, however, may well be replaced with any of methods as explained below.

After the contract with the newsdealer, the subscriber having or to have the home terminal 5 receives from a salesperson a memory card in which the contractual contents are stored together with the descrambler key described above, and he/she puts the information items into the home terminal 5 by the memory card driver 510 so as to register them as the reception permission information. Alternatively, the subscriber-to-be purchases a disk device which stores the descrambler key and the contractual contents therein and which is sold at a price dependent upon the contractual contents at the newsdealer, and he/she registers the information items as the reception permission information. In this case, the number of times which the newspaper data can be recorded, etc. may well be included in the contractual contents in the disk storage medium. In addition, each of the newsdealer terminals 3 and 4 and the home terminals 5 operates so that the newspaper data corresponding to the contractual contents stored in the disk storage medium may be prevented from being recorded in any disk device other than the purchased disk device. Also, each terminal prevents the newspaper data from being recorded in excess of the number of times specified in the contractual contents.

As another method, in the case where the descrambler key is received by accessing the predetermined contract center through the modem communication controller 518, the contractual contents may well be obtained together with the key and be registered as the availability information. In this case, it is favorable to employ a system in which the subscription to the newspaper is automatically charged by the access to the contract center.

Moreover, the contractual contents (reception permission information) to be stored in the home terminal 5 may well be encrypted. A key for decrypting the contractual contents is affixed, and is transmitted together with the newspaper data included in the contractual contents (reception permission information). At the home terminal 5, the contractual contents are decrypted by the use of the key, and the newspaper data are recorded only when the contractual contents (reception permission signal) have agreed with the contents of the management information of the newspaper data.

Next, in the foregoing embodiment, each of the newsdealer terminals 3 and 4 and the home terminals 5 acquires the descrambler key by any of the techniques other than broadcast. The descrambler keys, however, may well be sent by the broadcast from the newspaper edit/broadcast system 2 of the branch office of the newspaper publishing company to the individual terminals 3, 4 and 5 by the use of the control frames (in FIG. 4A) similarly to the contractual contents explained above. That is, the newsdealer terminals 3 and 4 and the home terminals 5 which acquire the descrambler keys to be broadcast may well be controlled by the use of the terminal IDs. In this case, each of the newsdealer terminals 3 and 4 and the home terminals 5 registers the descrambler key contained in the data field of the received control frame in the descrambler 532 on condition that the terminal ID of the pertinent terminal itself is contained in the control data part of the control frame. Thus, the key can be altered at will on the side of the newspaper publishing company.

Further, in the dispatch of the newspaper data employing the radio transmission line as described above, each of the newsdealer terminals 3 and 4 and the home terminals 5 sometimes fails to properly receive the newspaper data, depending upon the status of the transmission line, etc. In order to cope with such a situation, any of the contrivances to be explained below may well be adopted.

The newspaper edit/broadcast system 2 in the branch office of the newspaper publishing company affixes an error detecting code to each of the files that constitute the newspaper data. Under this condition, the branch office system 2 broadcasts the identical newspaper data repeatedly several times. Each of the newsdealer terminals 3 and 4 and the home terminals 5 checks the error of each file of the newspaper data stored in the RAM 503. In the presence of the error, the terminal 3, 4 or 5 discards the erroneous file without recording it in the disk storage medium, so as to record that file of the same identifier which is to be broadcast later.

Alternatively, the identifiers of the files contained in the newspaper data scheduled to be broadcast, and the end times of the broadcasts are registered in each home terminal 5 beforehand. In a case where the corresponding file failed to be received in spite of the lapse of the transmission end time, the home terminal 5 notifies the failure to, e.g., the newsdealer through the communication controller 518 as well as the terrestrial circuit 9. Incidentally, the scheduled transmission-end time mentioned above can be sent from the newspaper edit/broadcast system 2 of the branch office to the home terminal 5 that receives the file contained in the newspaper data of the newspaper scheduled to be broadcast, by broadcasting the data frame (FIG. 4B) in which the identifier of the particular file and the scheduled broadcast-end time are stored in the data field, while the management information of the particular newspaper data scheduled to be broadcast is stored in the management data part. Herein, the management information states to the effect that the information of the data field is indicative of the scheduled transmission-end time, and the home terminal 5 registers the information of the data field as the transmission end schedule in compliance with the management information.

Meanwhile, the news of the newspaper should preferably be updated with the progress of actual facts, similarly to television news. In this embodiment, therefore, the updating of the news is realized as stated below.

The newspaper edit/broadcast system 2 affixes creation dates and version Nos. to the individual files of the newspaper data, and then transmits the newspaper data. Upon receiving the newspaper data, each of the home terminals 5 and the newsdealer terminals 3 and 4 records the received newspaper data in the disk storage medium, and also creates a table in which the identifiers, creation dates and version Nos. of the respective files are associated. On the other hand, when any of the files has been updated in accordance with the updating of the corresponding news in the newspaper edit/broadcast system 2, this system 2 affixes the creation date and version No. to the updated file and then transmits the data frame (FIG. 4B) whose data field stores the particular file therein and whose management data part stores therein the management information of the newspaper data to which the particular file belongs. In each of the home terminals 5 and the newsdealer terminals 3 and 4, the above table is searched for the identifier of the particular file contained in the received frame. In the presence of the file, the identifier of which agrees with that of the received file, and the creation date and version No. of which differ from those of the received file, the file of the same identifier stored in the disk storage medium is updated by the received file, and the creation date and version No. recorded in association with the same identifier in the table are updated. In contrast, in the presence of the file whose identifier, creation date and version No. are all in agreement, the received file is discarded. Additionally, in the absence of the stored file having the same identifier, the received file is stored in the disk storage medium anew, and the identifier, creation date and version No. of the received file are added into the table. Incidentally, at the time of the first reception of the newspaper data, the table as stated above can also be created from the contents of the document files explained before.

Next, the newspaper data may well be broadcast to the individual home terminals 5 from the newsdealer terminal 3 which replaces the system 2 of the branch office of the newspaper publishing company. In this case, the architecture of the newsdealer terminal 3 is assimilated to that of the newspaper edit/broadcast system 2. Herein, the newsdealer terminal 3 edits the newspaper data received by the newspaper edit/broadcast system 2 of the branch office, in combination with the data of bills which the newsdealer having the pertinent newsdealer terminal 3 has been requested to insert into newspaper pages. Then, the newsdealer terminal 3 broadcasts the edited newspaper data to the home terminals 5.

Meanwhile, it is convenient that a dictionary for explaining terms contained in a newspaper can be utilized at the home terminal 5 or the portable read terminal, e.g., 800 (shown in FIGS. 8 and 9), simultaneously with the display of the newspaper.

Therefore, this embodiment may well be so constructed that the data of such a dictionary are also broadcast for utilization at each home terminal or portable terminal. In this case, a dictionary data file is stored in the data frame (FIG. 4B) similarly to the newspaper data, and the data frame is broadcast from the newspaper edit/broadcast system 2 of the branch office.

In the management data part of the data frame, the management information states to the effect that the data contained in the data field of the data frame are of the dictionary data file. Thus, each home terminal 5 or portable terminal 800 can handle the broadcast data as the dictionary data.

Figure 11:
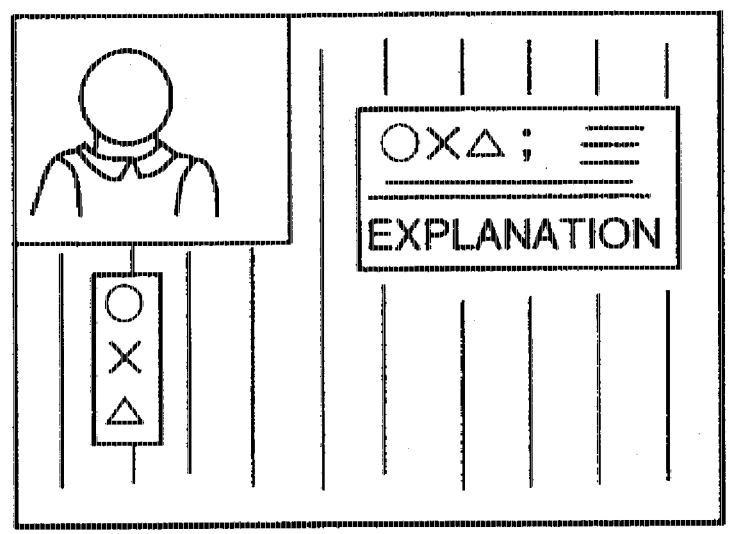
FIG. 11 is a sketch for explaining the operation of utilizing a dictionary in the embodiment of FIG. 1.

In addition, such dictionary data may well be permitted to supplement terms and to revise the explanation. Here, assuming that the dictionary data file is the aggregate of records which states the explanation for the terms, the supplement or revision can be done as follows: The record of the term to be supplemented or revised is stored in the data frame similarly to the dictionary data, and this data frame is broadcast. At each home terminal 5 or portable terminal 800, the record contained in the received data frame is added to the dictionary file, or the corresponding record in the dictionary file is updated by the received record. Incidentally, a program for utilizing such dictionary data is installed in each home terminal 5 or portable terminal 800 beforehand. In accordance with the program, the home terminal 5 or portable terminal 800 accepts the designation of any term in the displayed newspaper made with the input device 507 or input pen 803, accesses the dictionary data file, and displays the corresponding explanation of the designated term in a window form as illustrated in FIG. 11.

Although, in the foregoing embodiment, the newspaper data are recorded after having been descrambled, they may well be recorded without being descrambled, and be descrambled in reading them.

The foregoing embodiment has referred to the case where only a newspaper issued by a single newspaper publishing company is broadcast. However, a plurality of newspaper or book publishing companies may well broadcast publication data or various information items similarly to the newspaper data by the use of one or more frequency channels. Such newspaper data, publication data and various information items being the subjects to which subscribers subscribe shall be collectively called the "dispatch data".

Figure 12:
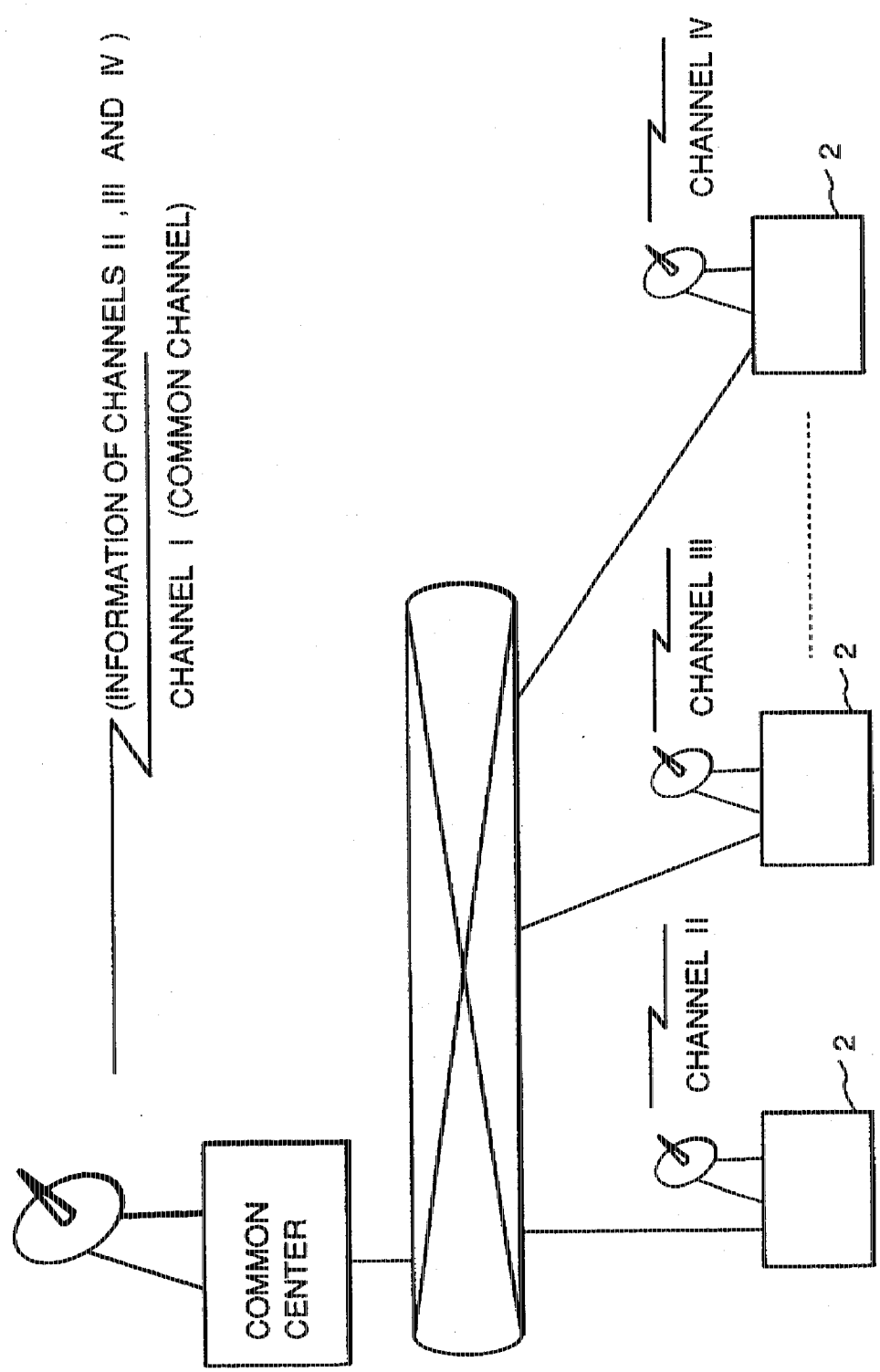
FIG. 12 is a diagram showing the concept of using a common channel according to another embodiment of the present invention.

In this case, as illustrated in FIG. 12, a common center for broadcasting the contents of the individual broadcasts may well be built so as to offer the information items of the respective broadcasts, such as frequency channels, broadcasting times and contents, through a specified frequency channel (called the "common channel"). The information items of the common channel are not subjected to scrambling. In addition, regarding a data frame received through the common channel, each home terminal 5 is permitted to utilize all the received contents without performing a control based on reception permission information, that is, without discarding the data frame. The information of the common channel may well be, for example, a guide video image. In this case, the home terminal 5 displays the received guide video image in real time. Of course, the common channel information may well be a text, voice or in any other format, and the home terminal 5 processes the information by a technique conforming to the adopted information format.

In the case where the plurality of newspaper or book publishing companies broadcast the dispatch data of newspapers, publications or/and various information items by the use of one or more frequency channels in this manner, the contractual contents explained before should desirably be more subdivided so as to realize detailed contracts. By way of example, the sorts of newspapers, books etc., and the classes of information items are provided in the contractual contents. The sort and the class are entered into management information which is affixed to the dispatch data. The classes may be defined at will by each of the information providers, and general information and expert information, for example, are considered as the classes. Incidentally, the class need not always be afforded for every aggregate of the dispatch data, but the classes may well be afforded to the respective element files of the dispatch data in broadcasting these data. Herein, the home terminal 5 compares its utilization permission information with the class for every element file and controls its recording operation for every element file. Of course, the same applies to the newspaper data explained before.

As such dispatch data, an application program or the like utilizable at the home terminal 5 or the portable terminal 800 can also be dispatched similarly to the newspaper, the book, etc.

In the information dispatching system thus far described, how each subscriber is charged for his/her subscription becomes a problem in practical use.

In the system, therefore, the charging or accounting may well be implemented as explained below.

Figure 13:
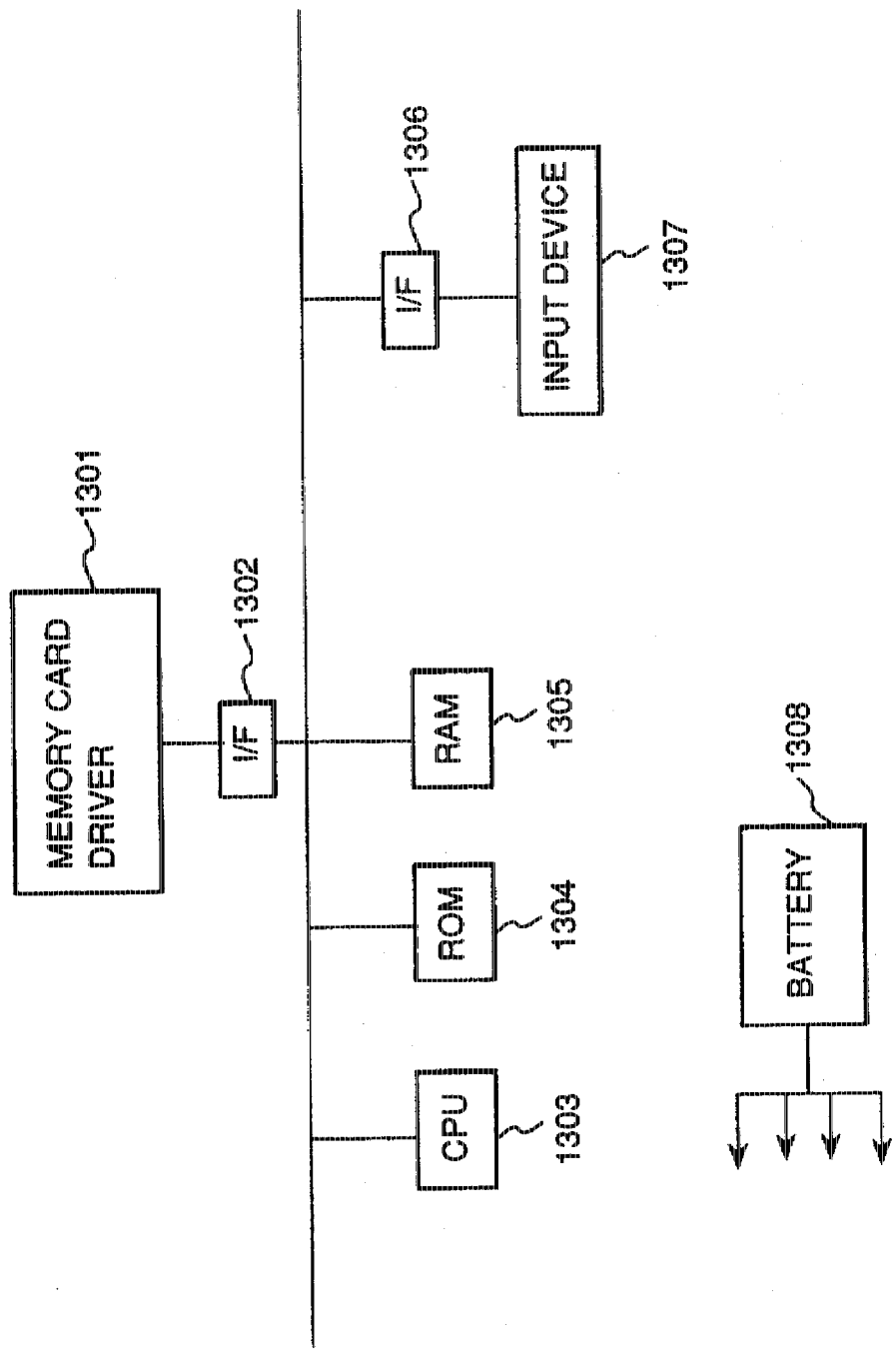
FIG. 13 is a block diagram showing the architecture of a portable memory card read/write device in each of the embodiments of FIGS. 1 and 12.

The CPU 501 of the home terminal 5 shown in FIG. 5 manages the histories of the recording operations of the disk drive 517 for the individual information providers. When a bill collector comes, he/she delivers to the subscriber a charge paying memory card for the information provider for which the bill collector works. Then, the subscriber inserts the memory card into the memory card driver 510. Upon recognizing the insertion of the charge paying memory card, the CPU 501 writes the history of the recording operations, based on the reception from the pertinent information provider, into the memory card in accordance with the information provider ID or the like stored in this memory card beforehand. The bill collector receives the memory card from the subscriber, and he/she reads out and recognizes the identifiers, recording time periods, classes etc. of the newspapers, books etc. recorded by the particular subscriber, by means of a memory card read/write device of portable type as shown in FIG. 13. Then, the bill collector calculates the charges and receives payment. Referring to FIG. 13, the memory card read/write device includes a memory card driver 1301, a CPU 1303, a ROM 1304, a RAM 1305, an input device 1307, and I/F (interface) circuits 1302 and 1306. Numeral 1308 indicates a battery.

In this regard, it is also possible to write a descrambler key and contractual contents into the memory card by the use of the portable type memory card read/write device at the time of the contract and to deliver the memory card to the subscriber. Of course, the memory card may well be replaced with a disk medium. Incidentally, the history of the reading operations of the disk drive 517 may well be managed instead of the history of the recording operations so as to charge the subscriber in accordance with the situation of the reading operations.

Meanwhile, the information dispatching system as described above can be applied to the conveyance of an urgent alarm by remote-controlling the home terminal 5 by the use of the control frame (FIG. 4A) explained before.

The urgent alarm is broadcast through a certain specified frequency channel by a warning center or the like, while at the same time, the control frame which stores therein a command for changing-over any reception channel to the urgent-alarm broadcasting channel and for reproducing the urgent alarm is broadcasted to all the other frequency channels. In the control frame, a specified ID is stored as a terminal ID. On the other hand, each home terminal 5 prestores therein the specified ID in addition to the terminal ID of its own, and executes the command of the control frame containing the specified ID. In this case, the home terminal 5 changes-over the reception channel to receive and reproduce the urgent broadcast. Alternatively, the home terminal 5 operates in compliance with the command contents of the control frame transmitted on the channel broadcasting the urgent alarm, thereby reproducing the urgent alarm. Herein, it is desirable that the urgent alarm is broadcast as voice data, while the home terminal reproduces the voice data in real time by means of a voice decoder mounted therein. As a matter of course, however, the urgent alarm may well be any of a text, a picture, etc.

As explained above, the terminals on the reception side can be remote-controlled from the broadcast side in the information dispatching system according to this embodiment. Therefore, this feature may well be utilized for performing the setup etc. of the peripheral devices of the home terminals 5 by the remote controls before the broadcast of the dispatch data.

Figure 14A:
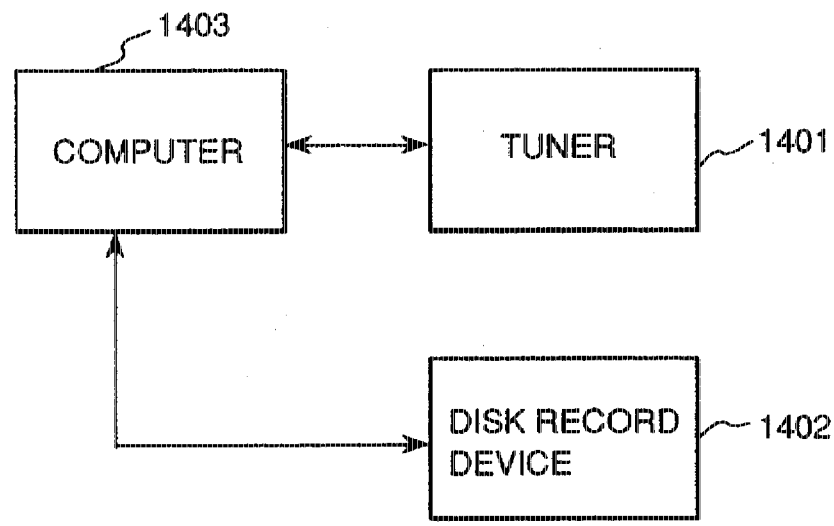
FIGS. 14A and 14B are block diagrams each showing another example of the architecture of the home terminal.
Figure 14B:
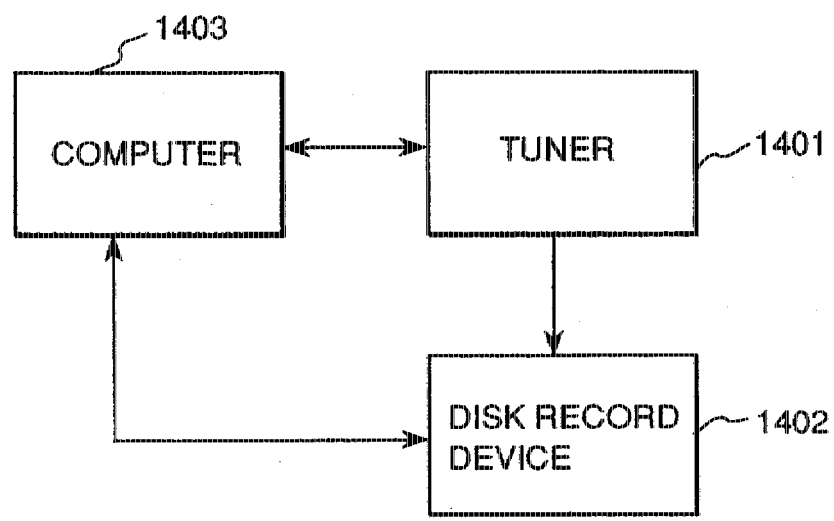

Such remote controls are effective in a case, for example, where the functions of each home terminal 5 are distributively implemented by a tuner 1401, a disk record device 1402 and a computer 1403 which are independent of one another as shown in FIG. 14A or FIG. 14B. FIG. 14A illustrates a construction in which the computer 1403 accepts the dispatch data from the tuner 1401 and records them in a disk medium set in the disk recorder 1402, while FIG. 14B illustrates a construction in which the tuner 1401 directly writes the dispatch data into such a disk medium.

In this case, the control based on the control frame is performed by the tuner 1401, and processing such as the startup of the disk recorder 1402 and the computer 1403 is effected before the reception of the dispatch data in accordance with the remote control based on the control frame. The recording itself of the dispatch data may well be done in accordance with such a remote control. On this occasion, the tuner 1401 commands the computer 1403 or the disk recorder 1402 to record the received data, in accordance with the remote control based on the control frame. In the case of the construction as shown in FIG. 14B, those controls of the reception and recording which use the terminal ID and contractual contents are performed on the side of the tuner 1401. Besides, in the case of the construction as shown in FIG. 14A, the reception and recording controls using the terminal ID and contractual contents may be done on the side of either the tuner 1401 or the computer 1403.

Although, in this embodiment, the encryption based on the scrambling is adopted for encrypting the contents of the broadcast, encryption based on any other technique may well be utilized.

As described above, according to the present invention, it is possible to provide an information dispatching system in which various kinds of information items including the information of a newspaper can be directly dispatched to individual homes by the use of a communication channel, which enables individual subscribers to effectively utilize the dispatched information.

What is claimed is:

1. An information dispatching system, comprising an information offering office and a plurality of receiving terminals, wherein:

said information offering office includes:

edit means for editing digitized information data, and broadcast means for broadcasting the edited information data; and each of said receiving terminals includes:

reception means for receiving the broadcasted information data, record means for recording the received information data in a storage medium, control means for selectively displaying the recorded information data on a display screen, and input means for receiving an operational command from a user;

wherein said edit means edits digitized newspaper data as said digitized information data to a format having:

a header file containing headings attached to respective news items of the newspaper data, an element file containing element information representing substantial contents of the newspaper data for display, and a layout file containing layout information defining, by page, a display layout of the element information in each of said element files corresponding to the headings in said header file, and wherein said control means operates according to a first mode for displaying a list of the headings contained in said header file, and a second mode for displaying, by page, all the element information in the element file, in response to an operational command received by said input means that designates one of the displayed headings, according to the layout information in the layout file corresponding to the designated heading.

2. An information dispatching system as defined in claim 1, wherein along with the information data, said broadcast means broadcasts, through a radio channel, software to be utilized with said information data;

wherein said reception means receives the broadcasted software with the information data; and wherein said record means records the received software with the information data in a portable storage medium.

3. An information dispatching system as defined in claim 2, wherein:

said information offering office includes encryption means for encrypting the information data by the use of a specified cryptic key prior to broadcast, and means for affixing terminal identifiers, respective receiving terminals permitted to receive the information data, to the specified cryptic key, and then causing said broadcast means to broadcast the cryptic key bearing the terminal identifiers; and each of said receiving terminals includes means for storing its own terminal identifier therein, means for storing the received cryptic key therein when said reception means has received said specified cryptic key bearing the stored terminal identifier, and decryption means for decrypting said received information data by the use of the stored cryptic key.

4. An information dispatching system as defined in claim 2, further comprising:

at least one service office which includes means for storing a predetermined cryptic key therein, and means for bestowing the stored cryptic key on the receiving terminal in compliance with an access of said receiving terminal to said service office through a public network;

said information offering office including encryption means for encrypting the information data to-be-broadcasted by the use of the predetermined cryptic key; and each of said receiving terminals including means for acquiring said predetermined cryptic key by access to said service office through the public network, means for storing the acquired cryptic key therein, and decryption means for decrypting said received information data by the use of the stored cryptic key.

5. An information dispatching system as defined in claim 2, wherein:
   said information offering office includes means for affixing management information expressive of an attribute of the information data to the information data to be broadcasted, and means for affixing terminal identifiers, of the respective receiving terminals permitted to utilize the information data of the specified attribute to said specified attribute of said information data, and then causing said broadcast means to broadcast the specified attribute bearing the terminal identifiers; and
   each of said receiving terminals includes means for storing its own terminal identifier therein, means for storing the received attribute therein when said reception means has received said specified attribute bearing the stored terminal identifier, and means for causing said record means to record said received information data in said storage medium, only when the management information affixed to said received information data is matched with the stored attribute.

6. An information dispatching system as defined in claim 2, wherein:
   said information offering office includes means for affixing management information expressive of an attribute of the information data to the document information to be broadcasted;
   an attribute of the information data recordable in said portable storage medium is prerecorded in said portable storage medium; and
   each of said receiving terminals includes means for causing said record means to record said received document information in said storage medium, only when the management information affixed to said received information data is matched with the attribute recorded in said portable storage medium; and
   said portable storage medium is set in said record means.

7. An information dispatching system as defined in claim 2, wherein each of said receiving terminals further includes a memory card driver, means for managing a history of the records of the information data in said portable storage medium, and means for writing the managed history into a memory card set in said memory card driver, on a predetermined event.

8. An information dispatching system as defined in claim 7, further comprising portable charging terminals each of which includes a second memory card driver, means for calculating a fee for subscription of the document information by said receiving terminal which has written the history into said memory card set in said second memory card driver, and an output device for indicating the calculated fee.

9. An information dispatching system as defined in claim 1, wherein:
   said information offering office includes encryption means for encrypting the information data by the use of a specified cryptic key prior to broadcast, and means for affixing terminal identifiers, respective receiving terminals permitted to receive the information data, to the specified cryptic key, and then causing said broadcast means to broadcast the cryptic key bearing the terminal identifiers; and
   each of said receiving terminals includes means for storing its own terminal identifier therein, means for storing the received cryptic key therein when said reception means has received said specified cryptic key bearing the stored terminal identifier, and decryption means for decrypting said received information data by the use of the stored cryptic key.

10. An information dispatching system as defined in claim 1, further comprising:
    at least one service office which includes means for storing a predetermined cryptic key therein, and means for bestowing the stored cryptic key on the receiving terminal in compliance with an access of said receiving terminal to said service office through a public network;
    said information offering office including encryption means for encrypting the information data to-be-broadcasted by the use of the predetermined cryptic key; and
    each of said receiving terminals including means for acquiring said predetermined cryptic key by access to said service office through the public network, means for storing the acquired cryptic key therein, and decryption means for decrypting said received information data by the use of the stored cryptic key.

11. An information dispatching system as defined in claim 1, wherein:
    said information offering office includes means for affixing management information expressive of an attribute of the information data to the information data to be broadcasted, and means for affixing terminal identifiers, of the respective receiving terminals permitted to utilize the information data of the specified attribute to said specified attribute of said information data, and then causing said broadcast means to broadcast the specified attribute bearing the terminal identifiers; and
    each of said receiving terminals includes means for storing its own terminal identifier therein, means for storing the received attribute therein when said reception means has received said specified attribute bearing the stored terminal identifier, and means for causing said record means to record said received information data in said storage medium, only when the management information affixed to said received information data is matched with the stored attribute.

12. An information dispatching system as defined in claim 1, wherein:
    said information offering office includes means for affixing management information expressive of an attribute of the information data to the information data to be broadcasted;
    an attribute of the information data recordable in said storage medium is prerecorded in said storage medium;
    each of said receiving terminals includes means for causing said record means to record said received document information in said storage medium, only when the management information affixed to said received information data is matched with the attribute recorded in said storage medium; and
    said storage medium is set in said record means.

13. An information dispatching system as defined in claim 1, wherein each of said receiving terminals further includes a memory card driver, means for managing a history of the records of the information data in said storage medium, and means for writing the managed history into a memory card set in said memory card driver, on a predetermined event.

14. An information dispatching system as defined in claim 13, further comprising portable charging terminals each of which includes a second memory card driver, means for calculating a fee for subscription of the document information by said receiving terminal which has written the history into said memory card set in said second memory card driver, in accordance with the written history in said memory card, and an output device for indicating the calculated fee.

15. An information dispatching system as defined in claim 1, wherein said edited information data further include a directory file containing distinguishing information capable of identifying the edited information data from other information data, said receiving terminal receives and records a plurality of information data, and said control means further operates according to a third mode for displaying a list of the distinguishing information in the directory file stored by said record means, and in response to an operational command received by said input means designating one of the displayed distinguishing information in the directory file, a list of the headings in the header file of the information data containing said designated distinguishing information is displayed in said first mode.

16. An information dispatching system as defined in claim 1, wherein said control means further operates according to a third mode for displaying information corresponding to a specific area, in response to an operational command, received by said input means, designating the specific area of the element information displayed on said display screen.

17. An information dispatching system as defined in claim 1, wherein said information offering office includes a motion-picture CODEC, a still-picture CODEC and a voice CODEC, said element information in said element file contains motion-picture data, still-picture data and voice data, which have been coded respectively by the motion-picture CODEC, the still-picture CODEC and the voice CODEC, said receiving terminal includes a motion-picture decoder, a still-picture decoder and a voice decoder, and said control means decodes the coded motion-picture data, the coded still-picture data and the coded voice data by said motion-picture decoder, said still-picture decoder and said voice decoder, respectively, so as to display or reproduce the respective decoded data.

18. An information dispatching system as defined in claim 1, wherein said broadcasted information data contain a displayed specific area of the element information in the element file, which is related to one of a header file and an element file of other broadcasted information data, and said control means further includes a mode for displaying said one of a header file and an element file relating to said specific area, in response to the operational command designating the specific area of the element information being displayed on said display screen.

19. An information dispatching system as defined in claim 1, wherein a displayed specific area of said element information is related to a program, and said control means further includes a mode for executing the program relating to the displayed specific area, in response to an operational command received by said input means, designating the specific area of the element information being displayed on said display screen.

20. An information dispatching system as claimed in claim 1, wherein said broadcast means broadcasts the edited information through a radio channel.

21. An information dispatching system comprising a central office, a plurality of local offices and a plurality of receiving terminals, wherein:

said central office includes means for electronically creating first newspaper data, and means for transmitting the created first newspaper data to the individual local offices;

each of said local offices includes means for electronically creating second newspaper data, means for receiving said first newspaper data from said central office, means for creating third newspaper data into which the received first newspaper data and the second newspaper data individually created by the pertinent local office are electronically edited, and means for broadcasting the created third newspaper data through a radio channel; and each of the receiving terminals includes means for receiving the third newspaper data broadcasted from a specified one of said local offices, record means for recording the received third newspaper data, control means for selectively displaying the recorded third newspaper data on a display screen, and input means for receiving an operational command from a user;

wherein said means for creating third newspaper data edit said first and second said newspaper data to a format having:

a header file containing headings attached to respective news items of the newspaper data, an element file containing element information representing substantial contents of the newspaper data for display, and a layout file containing layout information defining, by page, a display layout of the element information in each of said element files, corresponding to the headings in said header file; and wherein said control means operates according to a first mode for displaying a list of the headings contained in said header file, and a second mode for displaying, by page, all the element information in the element file, in response to an operational command received by said input means that designates one of the displayed headings, according to the layout information of the layout file corresponding to the designated heading.

22. An information dispatching system as defined in claim 21, wherein:

said record means of each of said receiving terminals records said third newspaper data in a portable storage medium which is set in said record means; and said information dispatching system further comprises portable read terminals each of which includes read means for reading said third newspaper data from one of said portable storage media, means for reconstructing an image of a newspaper which is expressed by said third newspaper data read from said portable storage medium, and means for displaying the reconstructed image of the newspaper.

23. An information dispatching system comprising a central office, a plurality of local offices and a plurality of receiving terminals, wherein:

each of said local offices includes means for electronically creating first newspaper data, and means for transmitting the created first newspaper data to said central office;

said central office includes means for electronically creating second newspaper data, means for receiving the plurality of first newspaper data transmitted from the plurality of local offices, means for affixing management information items by which said plurality of first newspaper data are respectively identified, and means for broadcasting said second newspaper data and the plurality of first newspaper data bearing the management information items, respectively, through a radio channel; and each of the receiving terminals includes means for storing therein identification information of at least one of said first newspaper data as is utilized by the pertinent home terminal itself, means for receiving the broadcasted second newspaper data and the broadcasted first newspaper data bearing the management information item, record means for recording the received second newspaper data and the received first newspaper data bearing said management information item which matches with the stored identification information, control means for selectively displaying the recorded newspaper data on a display screen, and input means for receiving an operational command from a user, wherein said central office edits said second newspaper data to a format having;

a header file containing headings attached to respective news items of the second newspaper data, an element file containing element information representing substantial contents of the second newspaper data for display, and a layout file containing layout information defining, by page, a display layout of the element information in each of said element files corresponding to the headings in said header file, and wherein said control means operates according to a first mode of displaying a list of the headings contained in said header file, and a second mode for displaying, by page, all the element information in the element file, in response to an operational command received by said input means that designates one of the displayed headings, according to the layout information of the layout file corresponding to the designated heading.

24. An information dispatching system as defined in claim 22, wherein:

said record means of each of said receiving terminals records said first and second newspaper data in a portable storage medium which is set in said record means; and said information dispatching system further comprises portable read terminals each of which includes read means for reading said second newspaper data from one of said portable storage media, means for reconstructing an image of a newspaper which is expressed by said second newspaper data read from said portable storage medium, and means for displaying the reconstructed image of the newspaper.

25. An information offering office including edit means for editing digitized newspaper data and broadcast means for broadcasting the edited newspaper data through a radio channel, wherein said edit means edits the newspaper data to a format having:

a header file containing headings attached to respective news items of the newspaper data, an element file containing element information representing substantial contents of the newspaper data for display, and a layout file containing layout information defining, by page, a display layout of the element information in each of said element files, corresponding to the headings in said header file.

26. A receiving terminal displaying newspaper data broadcasted from an information offering office through a radio channel, comprising:

reception means for receiving the broadcasted newspaper data, the broadcasted newspaper data having been edited to a form including a header file containing headings attached to each news item of the newspaper data, an element file containing element information representing substantial contents of the newspaper data for display, and a layout file containing layout information defining, by page, a display layout of the element information in each of said element files, corresponding to the headings in said header file, record means for recording the received newspaper data, control means for selectively displaying the recorded newspaper data on a display screen, and input means for receiving an operational command from a user;

wherein said control means operates according to a first mode for displaying a list of the headings contained in said header file, and a second mode for displaying, by page, all the element information in the element file, in response to an operational command received by said input means, designating one of the displayed headings, according to the layout information of the layout file corresponding to the heading.

27. A method of broadcasting and reproducing newspaper data, comprising the steps of:

editing the newspaper data to a form including a header file containing headings attached to each news item of the newspaper data, an element file containing element information representing substantive contents of the newspaper data for display, and a layout file containing layout information defining, by page, a display layout of the element information in each of said element files, corresponding to the headings in said header file, broadcasting the edited newspaper data through a radio channel, receiving the broadcasted newspaper data, recording the received newspaper data, displaying a list of headings contained in said header file, and displaying all the element information in the element file by page, in response to a command by a user designating one of said headings, according to the layout information in the layout file corresponding to the designated heading.

28. A method of broadcasting newspaper data from an information offering office, comprising the steps of:

editing the newspaper data to a form including a header file containing headings attached to each news item of the newspaper data, an element file containing element information representing substantive contents of the newspaper data for display, and a layout file containing layout information defining, by page, a display layout of the element information in each of said element files, corresponding to the headings in said header file, and broadcasting the edited newspaper data through a radio channel.

29. A method of displaying broadcasted newspaper data at a receiving terminal, comprising the steps of:

receiving the broadcasted newspaper data, said broadcasted newspaper data having been edited to a form including a header file containing headings attached to each news item of the newspaper data, an element file containing element information representing substantive contents of the newspaper data for display, and a layout file containing layout information defining, by page, a display layout of the element information in each of said element files, corresponding to the headings in said header file, recording the received newspaper data, displaying a list of headings contained in said header file, and displaying all the element information in the element file by page, in response to a command by a user designating one of said headings, according to the layout information in the layout file corresponding to the designated heading.

30. A recording medium in which newspaper data are recorded, wherein the recorded newspaper data are edited to a form including a header file containing headings attached to each news item of the newspaper data, an element file containing element information representing substantive contents of the newspaper data for display, and a layout file containing layout information defining, by page, a display layout of the element information in each of said element files, corresponding to the headings in said header file.

* * * * *